US 6,597,518 B2

(12) United States Patent
Nomura et al.

(10) Patent No.: US 6,597,518 B2
(45) Date of Patent: Jul. 22, 2003

(54) ZOOM LENS BARREL

(75) Inventors: Hiroshi Nomura, Saitama (JP); Nobuaki Aoki, Tokyo (JP); Yoshihiro Yamazaki, Saitama (JP); Satoru Nakamura, Tokyo (JP)

(73) Assignee: Pentax Corporation, Tokyo (JP)

( * ) Notice: Subject to any disclaimer, the term of this patent is extended or adjusted under 35 U.S.C. 154(b) by 209 days.

(21) Appl. No.: 09/774,123

(22) Filed: Jan. 31, 2001

(65) Prior Publication Data

US 2001/0017738 A1 Aug. 30, 2001

(30) Foreign Application Priority Data

Jan. 31, 2000 (JP) ........................................ 2000-022742
Feb. 1, 2000 (JP) ........................................ 2000-024042

(51) Int. Cl.[7] .............................................. G02B 15/14
(52) U.S. Cl. ....................................... 359/699; 359/700
(58) Field of Search ................................ 359/694, 699, 359/700, 701, 703, 704, 823, 826; 396/72, 79, 83

(56) References Cited

U.S. PATENT DOCUMENTS

| 5,313,329 | A | * | 5/1994 | Ueda | 359/676 |
| 5,589,987 | A | * | 12/1996 | Tanaka | 359/701 |
| 5,912,772 | A | | 6/1999 | Aoki | 359/701 |
| 5,956,189 | A | * | 9/1999 | Azegami et al. | 359/823 |
| 6,055,116 | A | | 4/2000 | Nomura et al. | 359/822 |
| 6,115,189 | A | | 9/2000 | Nomura et al. | 359/694 |
| 6,195,212 | B1 | * | 2/2001 | Miyamoto | 359/699 |
| 6,421,192 | B2 | * | 7/2002 | Nomura et al. | 359/828 |
| 6,469,840 | B2 | * | 10/2002 | Nomura et al. | 359/699 |
| 6,469,841 | B2 | * | 10/2002 | Nomura et al. | 359/699 |

* cited by examiner

*Primary Examiner*—Huy Mai
(74) *Attorney, Agent, or Firm*—Greenblum & Bernstein, P.L.C.

(57) ABSTRACT

A selectable assembling device of a zoom lens barrel includes a stationary barrel having a female helicoid, and linear guide grooves spaced at 120 degree intervals; a cam ring including bottomed cam grooves; a linear guide barrel provided with linear guide projections and linear guide slots spaced at 120 degree intervals; and a plurality of lens frames provided with sliding projections spaced at 120 degree intervals, which are engaged in the linear guide slots of the linear guide barrel, each of the sliding projections including a cam follower which is fitted in a corresponding bottomed cam groove of the cam ring. Upon assembly, a relative angular position of assembly for the cam ring and the linear guide barrel can be selected from among three circumferential positions spaced at 120 degree intervals. A device for guiding a flexible circuit board is also provided.

9 Claims, 22 Drawing Sheets

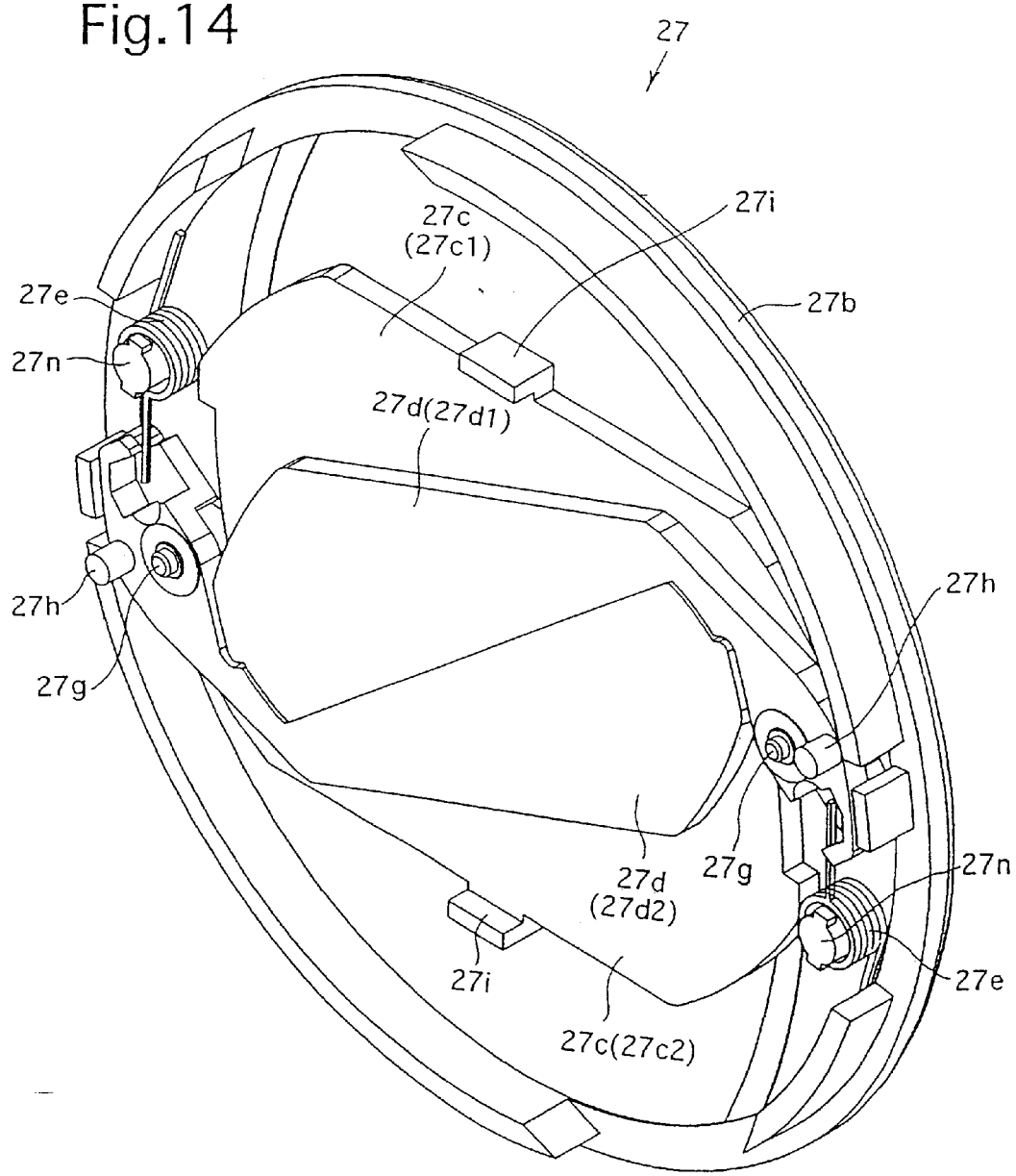

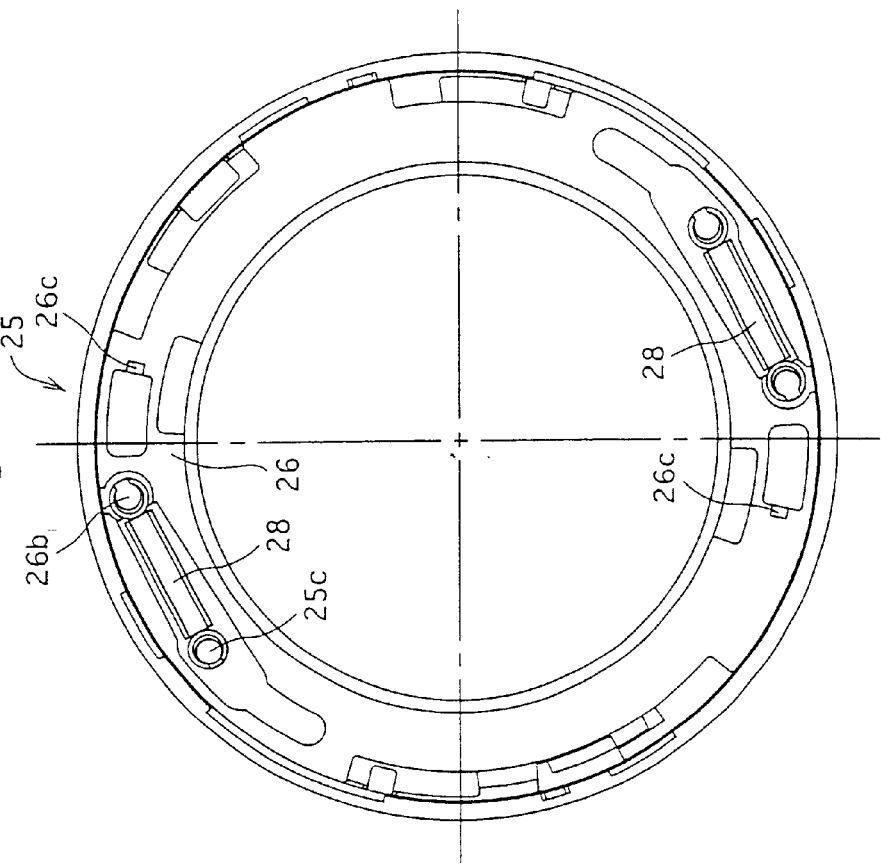
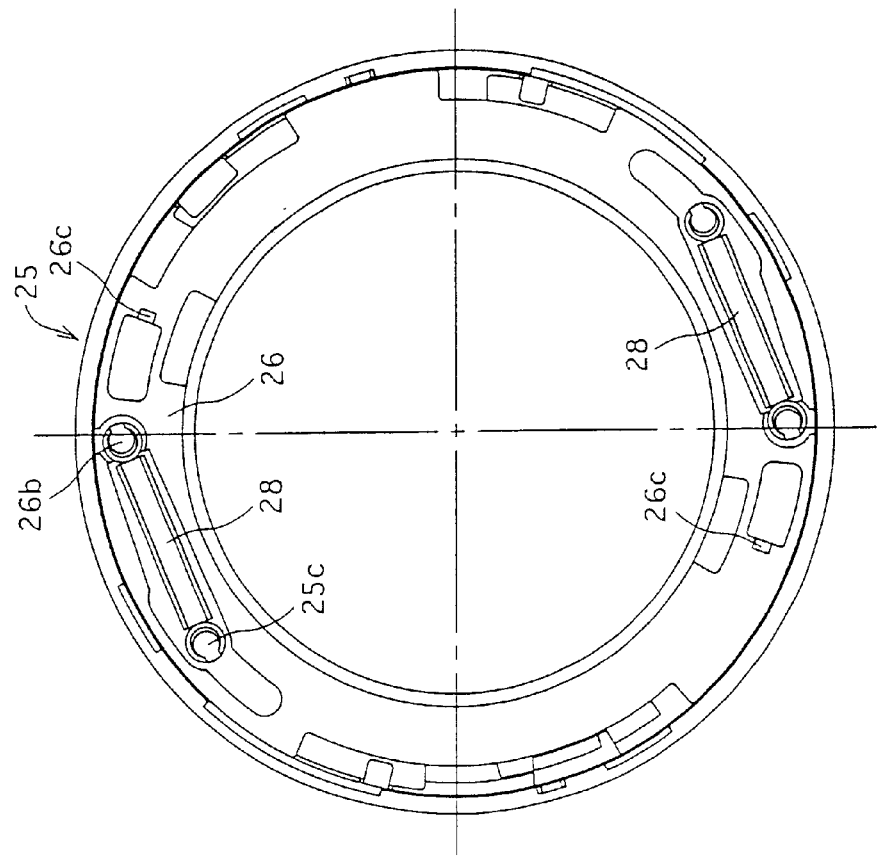

ZOOM LENS BARREL

BACKGROUND OF THE INVENTION

1. Field of the Invention

The present invention relates to a zoom lens barrel, and more precisely relates to a selectable assembling device for a zoom lens barrel in which deterioration of optical properties due to a manufacturing error or assembly error can be minimized. The present invention also relates to a guide device for a flexible printed circuit board extending from a shutter block thereof.

2. Description of the Related Art

In general, in a zoom lens barrel, a plurality of lens frames (lens groups) which are guided to linearly move are linearly moved in the optical axis direction in accordance with the rotation of a cam barrel having cam grooves with predetermined tracks. To increase the displacement of the lens groups, in most cases, the cam barrel is connected to a stationary barrel via helicoids. In general, the cam barrel and the stationary barrel are screw-engaged at only one assembly engagement position in the circumferential direction. Therefore, the assembly engagement position in the circumferential direction of the cam barrel and the lens frames (lens groups) which are guided to linearly move occurs at only one position.

In a conventional zoom lens barrel as mentioned above, since the components thereof inevitably have a manufacturing error, in general, optical performance characteristics expected on design cannot be obtained. In particular, in the prior art in which the assembly engagement position in the circumferential direction of the lens frame which are guided to linearly move and the cam barrel occurs at only one position, if the zoom lens barrel is assembled so that the manufacturing errors of the components are cumulated at the one assembly engagement position, there is no way to eliminate the cumulative manufacturing error.

In particular, in a digital camera, an image is formed on a CCD whose size is significantly smaller than the size of a picture plane of a silver-halide film camera, and hence, the required accuracy of the lens in a digital camera is about ten times higher than in a silver-halide film camera. For example, for the same angle of view, the focal length of the lens is reduced as the image size is reduced, and accordingly, the lenses, the lens frames and other components are all reduced in size. Consequently, influence on a lens system by the same dimensional error, e.g., an error of 10 μm, is exaggerated in a digital camera. Namely, an error which is negligible in a silver-halide film camera from the viewpoint of optical performance is not negligible in a digital camera. In particular, in a lens system of a digital camera, the deviation or inclination of the lens axes of the lens groups is more serious than the error of the plurality of lens frames (lens groups) in the optical axis direction, in view of the influence on the optical performance thereof.

In a zoom lens barrel for a lens shutter type camera, an exposure controlling shutter block is indispensable. In expensive digital cameras, in general, a shutter block is provided which is chiefly adapted to close a photographing light path after the shutter is released to thereby prevent unnecessary electric charges from being accumulated in the CCD. The shutter block is secured to any one of lens groups which are reciprocally moved in the optical axis direction in accordance with the zooming operation in a zoom lens barrel.

A flexible printed circuit board which is adapted to supply operation signals to the shutter block changes the position thereof in accordance with the zooming operation. To this end, a guide device for the printed circuit board (which permits the circuit board to extend or deform) must be provided. Various guide devices for various structures of the zoom lens barrel have been proposed.

SUMMARY OF THE INVENTION

It is an object of the present invention to provide an selectable assembling device in which a plurality of lens groups are reciprocally moved in the optical axis direction by the rotation of a cam barrel having a cam groove, wherein an assembly position can be selected in which deviation of the lens axes of the lens groups tends not to occur even if the components of the lens barrel have an manufacturing error.

It is another object of the present invention to provide a guide device which guides a flexible circuit board which extends from a shutter block, without interfering with the zoom mechanism and without reducing the mechanical strength of the components in a zoom lens barrel.

According to an aspect of the present invention, a selectable assembling device of a zoom lens barrel is provided, including a stationary barrel having a female helicoid and linear guide grooves, the linear guide grooves being formed across the female helicoid extending parallel to the optical axis of the zoom lens barrel, the linear guide grooves spaced at 120 degree intervals about the axis of the stationary barrel, wherein a portion of each of the plurality of linear guide grooves includes an introducing groove formed by cutting a portion of the female helicoid, a cam ring which is provided on the outer peripheral surface thereof with a male helicoid which is engaged with the female helicoid of the stationary barrel, the cam ring including bottomed cam grooves provided at 120 degree intervals about the axis of the cam ring on the inner peripheral surface thereof, the cam ring being rotated with respect to the stationary barrel which does not rotate; a linear guide barrel which is provided with linear guide projections and linear guide slots spaced at 120 degree intervals about the axis of the linear guide barrel, the linear guide projections being engaged in the linear guide grooves of the stationary barrel, the linear guide barrel and the cam ring being coupled so that the linear guide barrel is rotatable relative to the optical axis and moveable in the optical axis direction together with the cam ring; and a plurality of lens frames which are provided with sliding projections, that are spaced at 120 degree intervals about the optical axis, which are engaged in the linear guide slots of the linear guide barrel, each of the sliding projections including a cam follower thereon which is fitted in a corresponding bottomed cam groove of the cam ring. Upon assembly, a first relative angular position of assembly for the cam ring and the linear guide barrel can be selected from among three circumferential positions spaced at 120 degree intervals about common axes of the cam ring and the linear guide barrel.

Preferably, the assembly of the cam ring and the linear guide barrel is constructed so that when the male helicoid of the cam ring is engaged with the female helicoid of the stationary barrel, the linear guide projections of the linear guide barrel are engaged in the linear guide grooves of the stationary barrel at a second relative angular position selected from three circumferential positions spaced at 120 degree intervals about common axes of the linear guide barrel and the stationary barrel while maintaining the first relative angular position.

Preferably, the cam ring is provided with identification indicia which are adapted to identify the three circumferential positions of the first relative angular position.

In an embodiment, the first relative angular position is a combination of a third relative angular position and a fourth relative angular position. The sliding projections of the plurality of lens frames are engaged in the linear slots of the linear guide at the third relative angular position selected from three circumferential positions spaced at 120 intervals about the optical axis; and the cam followers of the sliding projections are engaged in the bottomed cam grooves of the cam ring at the fourth relative angular position selected from three circumferential positions spaced at 120 degree intervals about the axis of the cam ring.

According to another aspect of the present invention, a guide device for guiding a flexible circuit board of a zoom lens barrel is provided, including a plurality of lens groups which are guided to move in an optical axis direction of the zoom lens barrel to vary a focal length of a photographing optical system; a shutter block secured to any one of the lens groups; a rotational barrel; a cam ring which is located inside the rotational barrel and which is rotated by the rotation of the rotational barrel to move the lens groups in the optical axis direction; a flexible circuit board which is connected at one end thereof to the shutter block; and a flexible circuit board insertion slot formed in the rotational barrel and extending in the circumferential direction of the rotational barrel. The flexible circuit board extends rearward from the shutter block, bends forward at the rear end of the cam ring, extends forward between the rotational barrel and the cam ring, and extends to the outside of the rotational barrel through the flexible circuit board insertion slot of the rotational barrel.

In an embodiment, the rotational barrel is provided on the inner peripheral surface thereof with a plurality of inward projections that are spaced in the circumferential direction; wherein the cam ring is provided on the outer peripheral surface thereof with a plurality of axially extending rotation transmission grooves that are spaced in the circumferential direction, wherein each rotation transmission groove can be engaged with each respective the inward projections. The flexible circuit board insertion slot of the rotational barrel is located behind the inward projections with respect to the optical axis.

In an embodiment, the inward projections of the rotational barrel are spaced from one another at 120 degree intervals, wherein the rotation transmission grooves of the cam ring are spaced from one another at 120 degree intervals, and wherein the flexible circuit board insertion slot of the rotational barrel extends for at least 120 degrees about the optical axis.

In an embodiment, the cam ring is connected to a stationary barrel via helicoids so as to rotate and move in the optical axis direction.

In an embodiment, the rotational barrel is connected to the stationary barrel by a thread whose lead is smaller than that of the helicoids so as to rotate and move in the optical axis direction.

The present disclosure relates to subject matter contained in Japanese Patent Application No. 2000-22742 (filed on Jan. 31, 2000) and Japanese Patent Application No.2000-24042 (filed on Feb. 1, 2000) which are expressly incorporated herein by reference in their entireties.

BRIEF DESCRIPTION OF THE DRAWINGS

The present invention will be described below in detail with reference to the accompanying drawings in which:

FIG. 14 is a perspective view of the barrier block with an annular pressure plate being removed from the barrier block, viewed from behind the barrier block;

FIG. 17 is a front view of the external barrel that is supported by the external barrel to be freely rotatable about the optical axis, in a state where the barrier drive ring is rotated to one rotational limit thereof to thereby fully shut the two pairs of barrier blades;

FIG. 18 is a front view of the external barrel shown in FIG. 17, in a state where the barrier drive ring is rotated to the other rotational limit thereof to thereby fully open the two pairs of barrier blades;

DESCRIPTION OF THE PREFERRED EMBODIMENT

Figure 1:
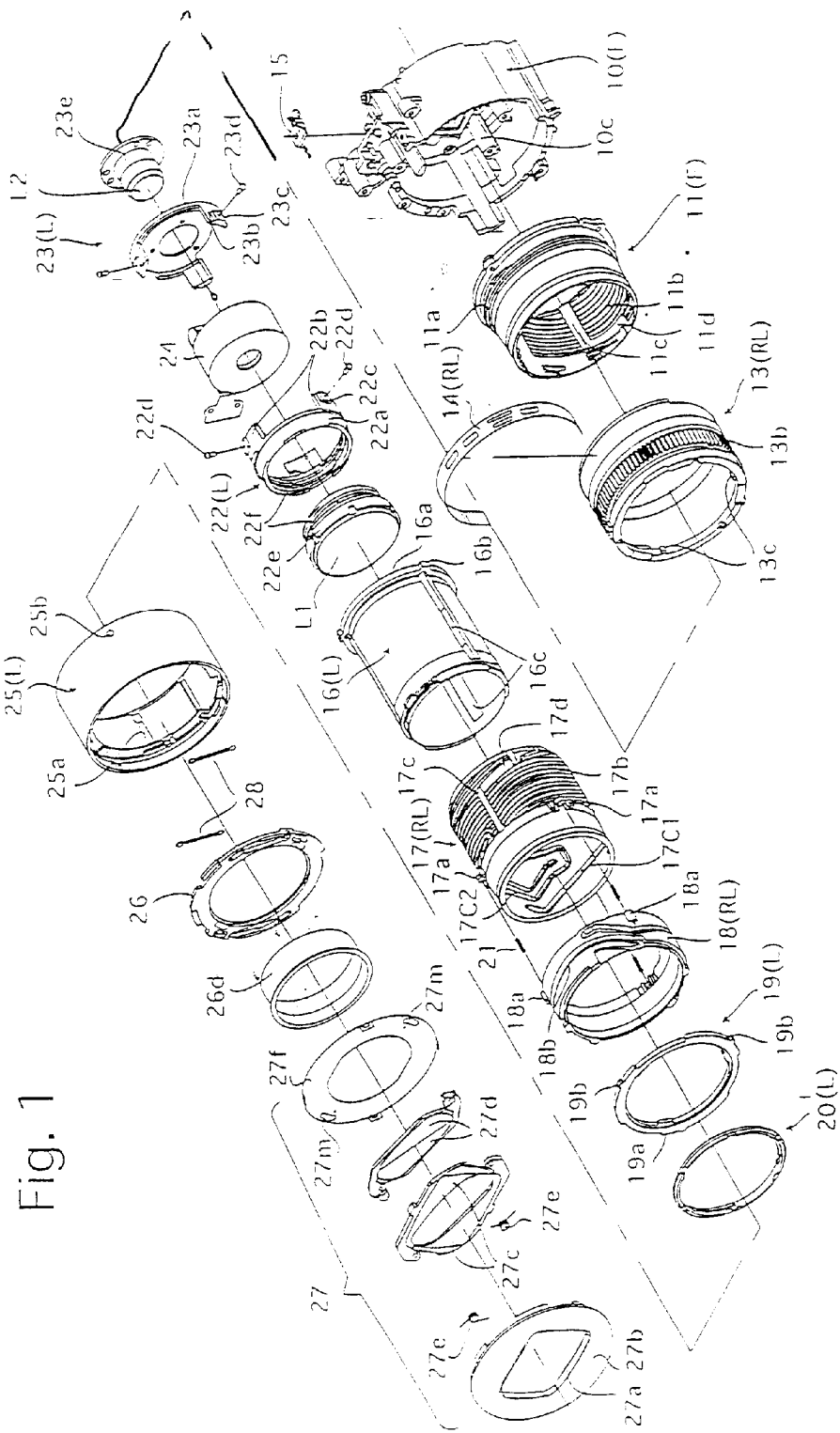
FIG. 1 is an exploded perspective view of an embodiment of a zoom lens according to the present invention, showing the overall structure thereof.

A preferred embodiment of a zoom lens (zoom lens barrel) according to the present invention that is incorporated in a digital camera will be hereinafter discussed. Firstly, the overall structure of the zoom lens will be discussed with reference mainly to FIGS. 1 and 2. In the drawings and the following descriptions, symbols "(F)", "(L)" and "(RL)" which are each appended as a suffix to the reference numeral of some elements of the zoom lens barrel indicate that the element is stationary, the element is movable linearly along an optical axis O of the zoom lens without rotating about the optical axis O, and the element is movable along the optical axis O while rotating about the optical axis O, respectively.

Figure 2:
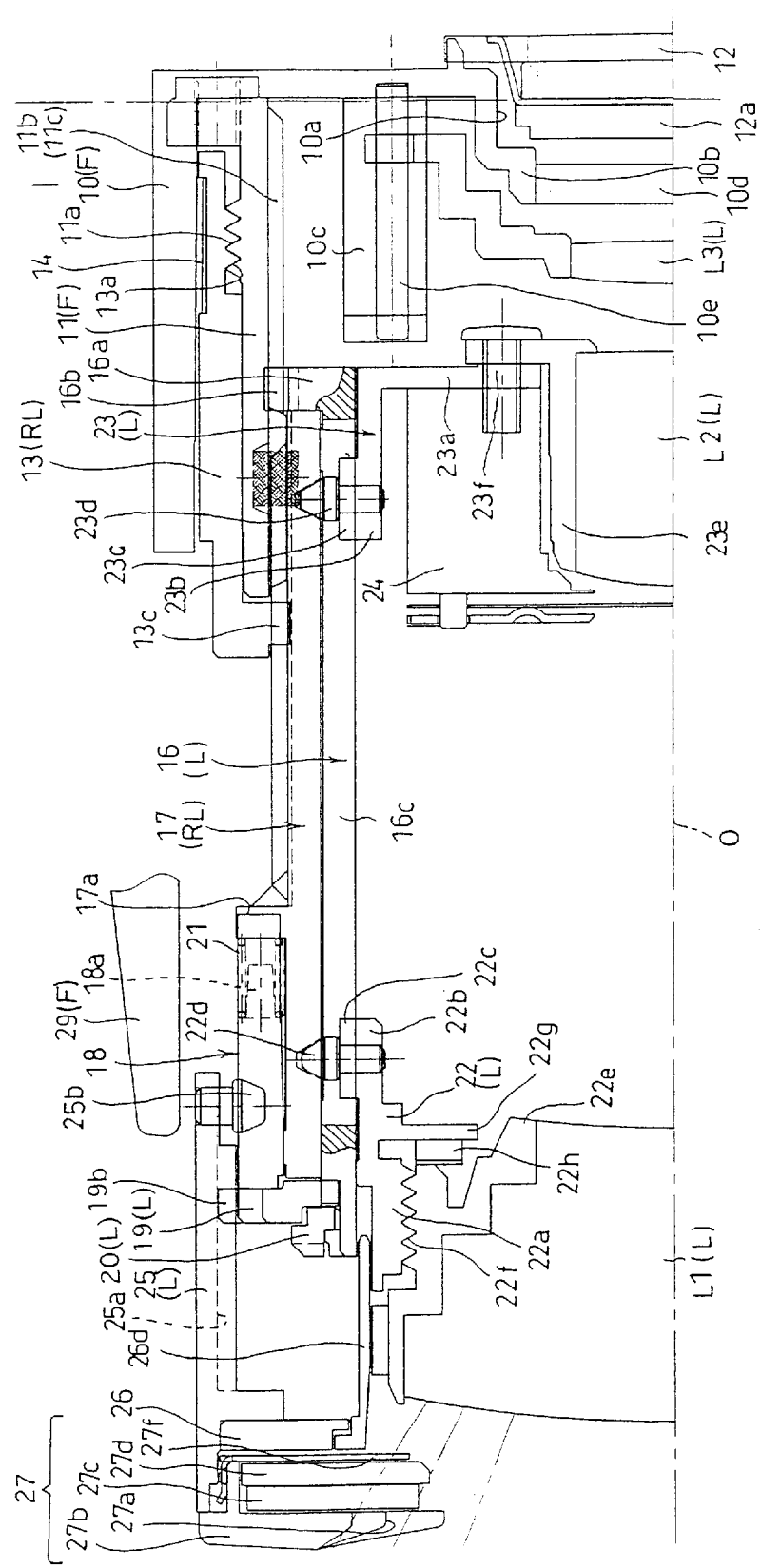
FIG. 2 is an axial cross sectional view of the zoom lens shown in FIG. 1, showing the zoom lens above the optical axis thereof.

The photographic optical system of the zoom lens includes three lens groups; namely, a first lens group (front lens group) L1 (L), a second lens group (middle lens group) L2 (L) and a third lens group (rear lens group) L3 (L), in this order from the object side (the left side as viewed in FIG. 2). The zoom lens performs zooming by moving the first and second lens groups L1 and L2 along the optical axis O relative to the sensitive surface of a stationary CCD 12a (see FIG. 2) and at the same time changing the space between the first and second lens groups L1 and L2 in a predetermined manner. The zoom lens performs a focusing operation by moving the third lens group L3 along the optical axis O to bring an object into focus. The third lens group L3 functions as a focusing lens group which is driven along the optical axis O independently of the axial position of each of the first and second lens groups L1 and L2. Thus, the zoom lens is an internal-focusing type zoom lens having a lens construction which allows the focus to be altered by moving the rearmost lens group provided as a focusing lens group internally within the lens barrel.

The zoom lens is provided with a housing 10 (F) which is fixed to a camera body of a digital camera (not shown) The housing 10 can be integral with the camera body to be provided as an element thereof. The zoom lens is provided in the housing 10 with a stationary barrel 11 (F) that is fixed to the housing 10. The stationary barrel 11 is provided on an outer peripheral surface thereof with a fine male thread 11a. The stationary barrel 11 is provided on an inner peripheral surface thereof with a female helicoid (female helicoidal thread) 11b and three linear guide grooves 11c (only one is shown in FIG. 1) extending parallel to the optical axis O, i.e., extending in the optical axis direction. The three linear guide grooves 11c are formed to cut across the female helicoid 11b. The three linear guide grooves 11c are formed at 120° intervals (i.e., at an equi-angular distance) about the axis of the stationary barrel 11.

As shown in FIG. 2, the housing 10 is provided with a CCD insertion opening 10a, a filter fixing portion 10b and a focusing lens group guide portion 10c. The CCD 12a which is fixed to a substrate 12 is positioned in the CCD insertion opening 10a. A filter 10d such as a low-pass filter is fixed to the filter fixing portion 10b. The third lens group L3 is guided by the focusing lens group guide portion 10c to be movable in the optical axis direction. The axial position of the third lens group L3 on the optical axis O is determined by the direction of rotation of a feed screw 10e and the angle of rotation (amount of rotation) thereof. The feed screw 10e extends parallel to the optical axis O from the camera body in the focusing lens group guide portion 10c. The feed screw 10e is driven by a pulse motor (not shown) provided in the camera body. The angle of rotation of the feed screw 10e is controlled via an encoder (not shown) of the pulse motor.

The zoom lens is provided on the stationary barrel 11 with a rotational barrel 13 (RL). The rotational barrel 13 is provided on an inner peripheral surface thereof with a fine female thread 13a which meshes with the fine male thread 11a of the stationary barrel 11. The rotational barrel 13 is provided on an outer peripheral surface thereof with a circumferential gear 13b (see FIG. 1). The rotational barrel 13 is driven to rotate about the optical axis O by a drive pinion (not shown) which meshes with the circumferential gear 13b. When the rotational barrel 13 is driven to rotate about the optical axis O, the rotational barrel 13 moves in the optical axis direction while rotating about the optical axis O in accordance with the engagement of the fine female thread 13a with the fine male thread 11a. The rotational barrel 13 is provided at the front end of an inner peripheral surface thereof with three inward projections 13c at 120° intervals about the axis of the rotational barrel 13. As shown in FIG. 1, a flexible coding plate 14 (RL) is fixed on an outer peripheral surface of the rotational barrel 13 along a circumference thereof, while a brush 15 (F) that is in contact with the coding plate 14 is fixed to the housing 10. The brush 15 remains in sliding contact with the code plate 14 regardless of a movement of the code plate 14 relative to the brush 15 when the code plate 14 moves in the optical axis direction in accordance with the engagement of the fine female thread 13a with the fine male thread 11a, so as to sense the rotational position of the rotational barrel 13 as digital and/or analogue information. The fine female thread 13a, which is provided on the rotational barrel 13, is provided as a device for supporting the rotational barrel 13 on the stationary barrel 11 so that the rotational barrel 13 can rotate freely about the optical axis O on the stationary barrel 11. The thread lead of each of the fine male thread 11a and the fine female thread 13a is much smaller than the thread lead of each of the male helicoid 17b of the cam barrel 17 and the female helicoid 11b of the stationary barrel 11. However, alternatively, the rotational barrel 13 can be supported on the stationary barrel 11 so as to be able to rotate freely about the optical axis O without moving in the optical axis direction relative to the stationary barrel 11.

The zoom lens is further provided with a linear guide barrel 16 (L), a first cam barrel (cam ring) 17 (RL) and a second cam barrel 18 (RL) The first cam barrel 17 is fitted on the linear guide barrel 16 to be rotatable about the optical axis O relative to the linear guide barrel 16 and to be immovable in the optical axis direction relative to the linear guide barrel 16. The second cam barrel 18 is fitted on the front end of the first cam barrel 17 to be rotatable together with the first cam barrel 17 about the optical axis O and also to be movable in the optical axis direction relative to the first cam barrel 17. The linear guide barrel 16, the first cam barrel 17 and the second cam barrel 18 are assembled in advance as a unit, and the rear of this barrel unit is positioned in the stationary barrel 11. The linear guide barrel 16 is provided at the rear end thereof with an outer flange 16a. A linear guide ring (flange ring) 19(L) is fixed to the front end of the linear guide barrel 16 via a retainer ring 20 (L). The first cam barrel 17 is held between the outer flange 16a and the linear guide ring 19, and is rotatable about the optical axis O relative to the linear guide barrel 16 and also movable together with the linear guide barrel 16 in the optical axis direction.

The second cam barrel 18, which is fitted on the front end of the first cam barrel 17, is provided at the rear end thereof with three linear guide portions 18a (only two are shown in FIG. 1) at 120° intervals about the axis of the second cam barrel 18. Each of the three linear guide portions 18a is provided with a spring holding groove 18a1, and a pair of guide grooves 18a2 positioned on the opposite sides of the spring holding groove 18a1 in a circumferential direction of the second cam barrel 18 (see FIGS. 8 and 9). Each of the three linear guide portions 18a is further provided, in each spring holding groove 18a1 at the front end (the left end as viewed in FIG. 8 or 9) of each spring holding groove 18a1, with an engaging projection 18a3. All of the spring holding grooves 18a1 and the pairs of guide grooves 18a2 extend parallel to the optical axis O. The first cam barrel 17 is provided on an outer peripheral surface thereof with three stopper portions 17a (only two are shown in FIG. 1) at 120° intervals about the axis of the first cam barrel 17. Each of the three stopper portions 17a is provided with a stopper projection 17a1, and a pair of guide projections 17a2 positioned on the opposite sides of the stopper projection 17a1 in a circumferential direction of the first cam barrel 17 (see FIG. 4). Each pair of guide projections 17a2 of the first cam barrel 17 are respectively fitted in the corresponding pair of guide grooves 18a2 of the second cam barrel 18 to be slidable in the optical axis direction relative to the second cam barrel 18, with a compression spring 21 being held between each engaging projection 18a3 and the corresponding stopper projection 17a1. Due to this structure, the second cam barrel 18 can slide on the first cam barrel 17 in the optical axis direction without rotating about the optical axis O relative to the first cam barrel 17. The compression springs 21 constantly bias the second cam barrel 18 toward the front of the zoom lens, so that the front end of the second cam barrel 18 is usually in press-contact with the linear guide ring 19. The second cam barrel 18 can move rearward, toward the rear of the zoom lens, against the spring force of the compression springs 21 by an amount of movement corresponding to a predetermined clearance in the optical axis direction between the guide grooves 18a2 and the guide projections 17a2. The second cam barrel 18 can also be slightly inclined with respect to the first cam barrel 17 (i.e., with respect to the optical axis O) by an amount of inclination corresponding to a predetermined clearance in a radial direction between the inner peripheral surface of the second cam barrel 18 and the corresponding outer peripheral surface of the first cam barrel 17.

The first cam barrel 17 is provided on an outer peripheral surface thereof with a male helicoid (male helicoidal thread) 17b that is engaged with the female helicoid 11b of the stationary barrel 11, and three rotation transmission grooves 17c that extend parallel to the optical axis O. The three rotation transmission grooves 17c are formed so as to cut across the male helicoid 17b. The three rotation transmission grooves 17c are formed at 120° intervals about the axis of the first cam barrel 17. The three inward projections 13c of the rotational barrel 13 are respectively engaged with the three rotation transmission grooves 17c to be relatively slidable to each other. The linear guide barrel 16 is provided on the outer flange 16a thereof with three linear guide projections 16b at 120° intervals about the axis of the linear guide barrel 16. Each linear guide projection 16b extends radially outwards to be engaged with the corresponding linear guide groove 11c of the stationary barrel 11. The linear guide barrel 16 is further provided with three linear guide slots 16c at 120° intervals about the axis of the linear guide barrel 16 so that the circumferential positions of the three linear guide slots 16c coincide with those of the three linear guide projections 16b. Each of the three linear guide slots 16c penetrates the linear guide barrel 16 radially and extends parallel to the optical axis O.

Figure 4:
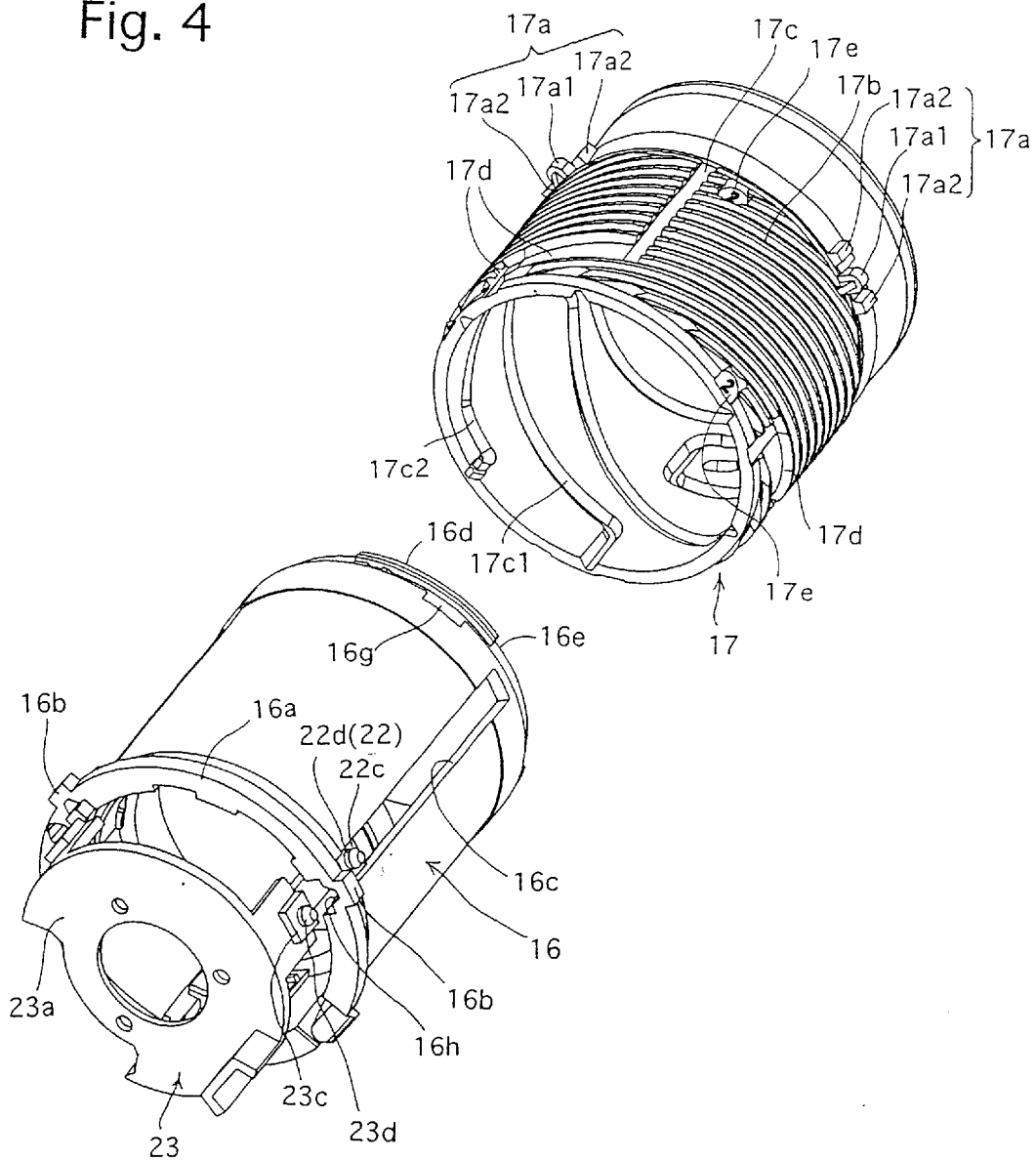
FIG. 4 is an exploded perspective view of the first cam barrel shown in FIG. 3, a linear guide barrel, a first lens frame and a second lens frame.
Figure 5:
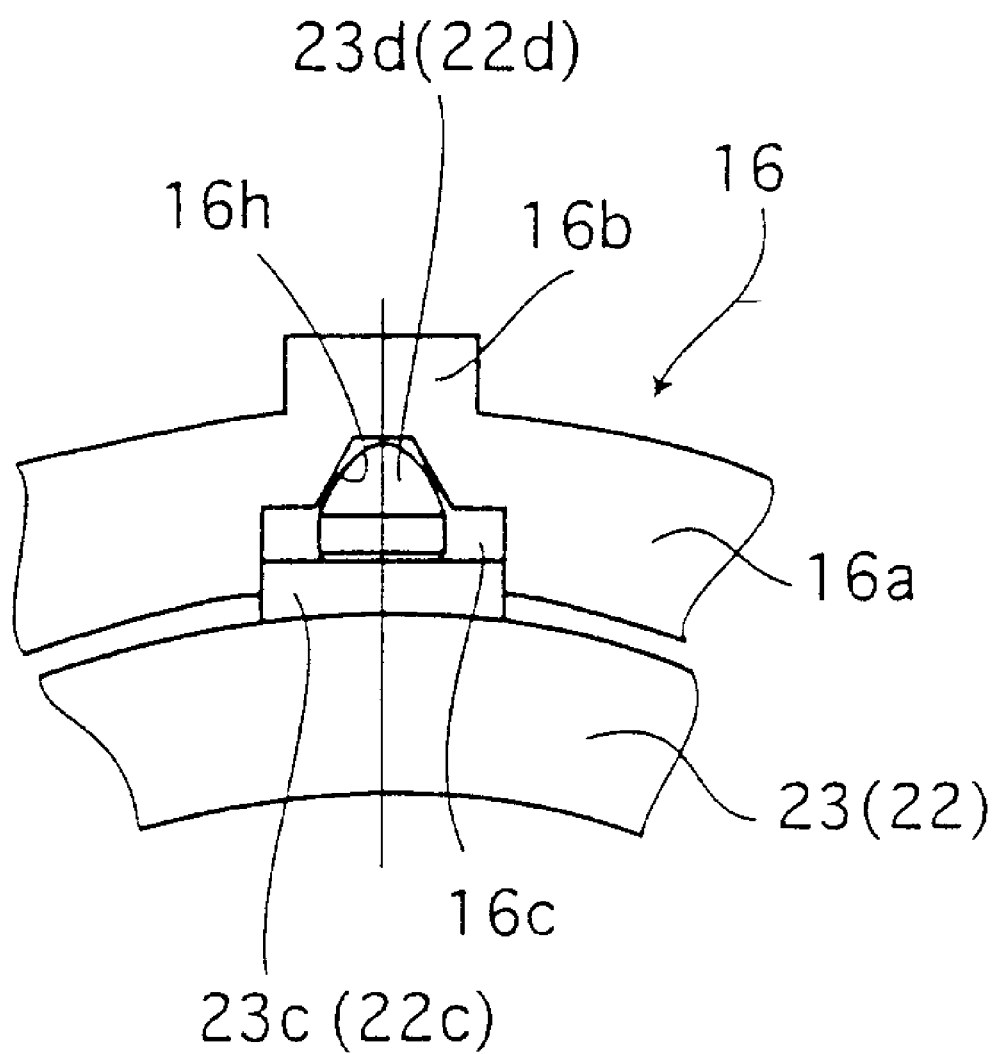
FIG. 5 is a fragmentary rear view of the linear guide barrel and the first lens frame, showing the periphery of an insertion groove of the linear guide barrel.
Figure 6:
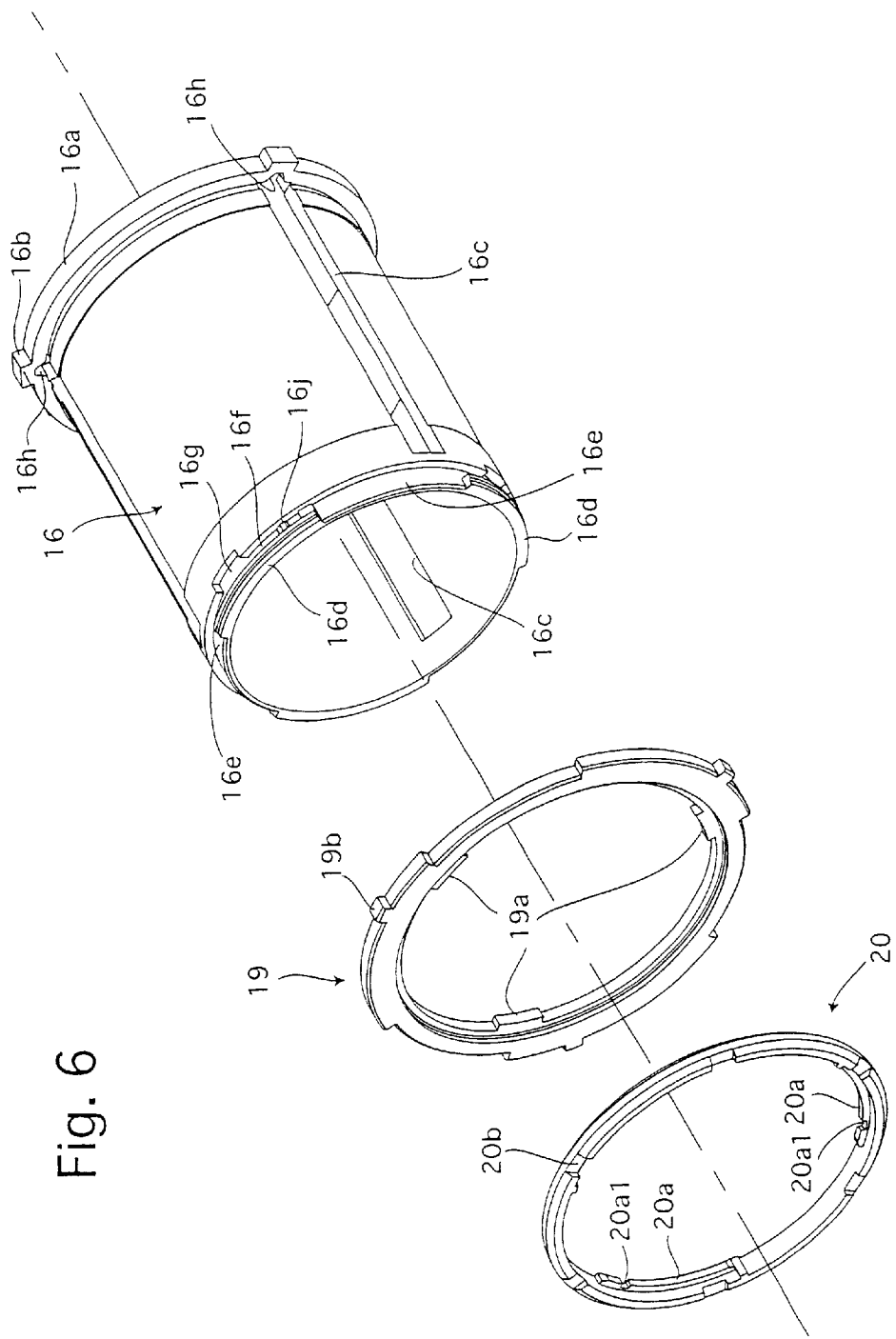
FIG. 6 is an exploded perspective view of the linear guide barrel, a linear guide ring and a retainer ring.

As can be seen in FIGS. 4, 5 and 6, each of the three linear guide slots 16c opens at the rear end of the linear guide barrel 16, and the rear end of each linear guide slot 16c is covered by the corresponding part of the outer flange 16a and the corresponding linear guide projection 16b at the radially outer side of the linear guide barrel 16. The outer flange 16a is provided with three insertion grooves 16h which respectively extend along a portion of each three linear guide slots 16c from the front end of the outer flange 16a to each respective rear end of the three linear guide slots 16c (i.e., the rear end of the outer flange 16a), so that a follower pin (cam follower) 22d and a follower pin (cam follower) 23d can be inserted into each linear guide slot 16c from the corresponding insertion groove 16h.

When the barrel unit which includes the linear guide barrel 16, the first cam barrel 17 and the second cam barrel 18 is coupled to the stationary barrel 11 and the rotational barrel 13, each of the three linear guide projections 16b of the linear guide barrel 16 is inserted into the corresponding linear guide groove 11c of the stationary barrel 11 via a corresponding introducing groove 11d formed on an inner peripheral surface of the stationary barrel 11, and each of the three inward projections 13c of the rotational barrel 13 is inserted into the corresponding rotation transmission groove 17c of the first cam barrel 17 via a corresponding introducing groove 17d formed on an outer peripheral surface of the first cam barrel 17. After each linear guide projection 16b and each inward projection 13c are inserted into the corresponding linear guide groove 11c and the corresponding rotation transmission groove 17c, respectively, the female helicoid 11b of the stationary barrel 11 and the male helicoid 17b of the first cam barrel 17 mesh with each other.

FIG. 2 shows a state where the barrel unit, which includes the linear guide barrel 16, the first cam barrel 17 and the second cam barrel 18, has been coupled to the stationary barrel 11 and the rotational barrel 13. In this state, rotating the rotational barrel 13 about the optical axis O via the gear 13b causes the rotational barrel 13 to move in the optical axis direction while rotating about the optical axis O due to the engagement of the fine female thread 13a with the fine male thread 11a. At the same time, the rotation of the rotational barrel 13 is transmitted to the first cam barrel 17 and the second cam barrel 18, which is fitted on the first cam barrel 17, due to the engagement of the inward projections 13c with the rotation transmission grooves 17c, so that the first cam barrel 17 and the second cam barrel 18 rotate about the optical axis O. At this time, the first cam barrel 17 and the second cam barrel 18 also move in the optical axis direction O due to the engagement of the male helicoid 17b with the female helicoid 11b. Furthermore, the linear guide barrel 16 moves in the optical axis direction without rotating about the optical axis O due to the engagement of the linear guide projections 16b with the linear guide grooves 11c, and at the same time the first and second cam barrels 17 and 18, which rotate about the optical axis O relative to the linear guide barrel 16, move together with the linear guide barrel 16 in the optical axis direction.

Figure 3:
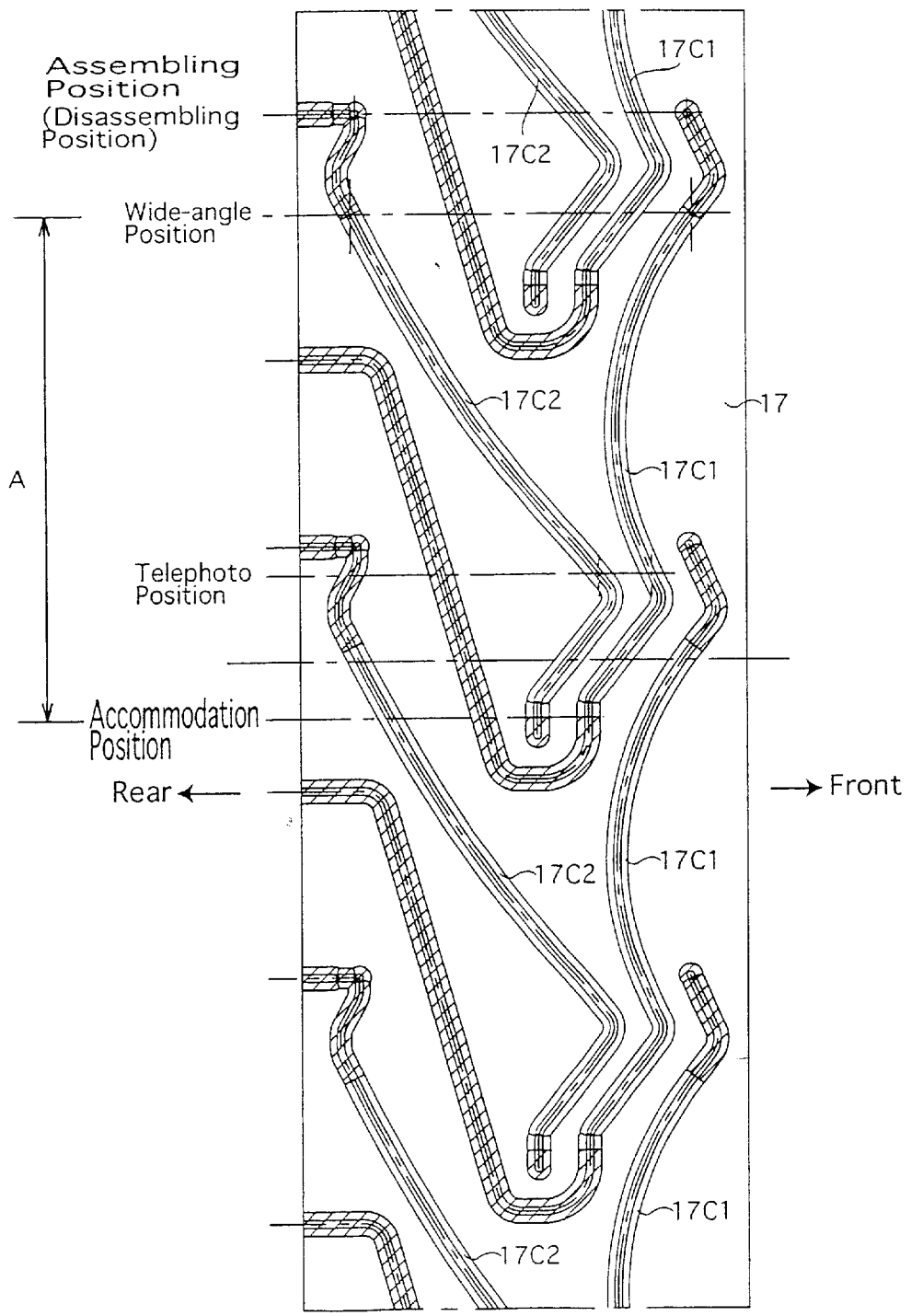
FIG. 3 is a developed view of the inner peripheral surface of a first cam barrel, showing the contours of first and second cam grooves formed on the inner peripheral surface of the first cam barrel.

The first cam barrel 17 is provided on an inner peripheral surface thereof with three first cam grooves (bottomed cam grooves) 17C1 for driving the first lens group L1, and three second cam grooves (bottomed cam grooves) 17C2 for driving the second lens group L2. FIG. 3 is a developed view of the inner peripheral surface of the first cam barrel 17, showing the contours of the first and second cam grooves 17C1 and 17C2. The three first cam grooves 17C1 are formed on the inner peripheral surface of the first cam barrel 17 at 120° intervals about the axis of the first cam barrel 17. Likewise, the three second cam grooves 17C2 are formed on the inner peripheral surface of the first cam barrel 17 at 120° intervals about the axis of the first cam barrel 17. Each of the first and second cam grooves 17C1 and 17C2 has three predetermined positions: an accommodation position, a telephoto position and a wide-angle position, in this order along the direction of rotation of the first cam barrel 17 (the vertical direction as viewed in FIG. 3). The telephoto position shown in FIG. 3 of each cam groove 17C1 and 17C2 determines the telephoto extremity of the corresponding lens groups L1 and L2, respectively; the wide-angle position of each cam groove 17C1 and 17C2 determines the wide-angle extremity of the corresponding lens groups L1 and L2, respectively; and the accommodation position of each cam groove 17C1 and 17C2 determines the position of the corresponding lens groups L1 and L2, respectively, when the power of the digital camera is turned OFF. The angle of rotation from the accommodation position to the wide-angle extremity position is shown by "A" in FIG. 3.

The zoom lens is provided with a first lens frame 22 (L) and a second lens frame 23 (L) which support the first lens group L1 and the second lens group L2, respectively. The first lens frame 22 is guided by the first cam grooves 17C1 and the linear guide slots 16c to be movable in the optical axis direction without rotating about the optical axis O. Likewise, the second lens frame 23 is guided by the second cam grooves 17C2 and the linear guide slots 16c to be movable in the optical axis direction without rotating about the optical axis O. The first lens frame 22 is provided with three resilient extending pieces 22b which extend rearward from a cylindrical portion 22a of the first lens frame 22. The three resilient extending pieces 22b are formed on the first lens frame 22 at 120° intervals about the axis of the first lens frame 22. Each resilient extending piece 22b is provided on a radially outer surface thereof with a square projection (sliding projection) 22c which extends radially outwards to be fitted in the corresponding linear guide slot 16c in a slidable manner in the optical axis direction. Each resilient extending piece 22b is further provided on top of each square projection 22c with the follower pin (cam follower) 22d, which is fixed to the resilient extending piece 22b to extend radially outwards. Each square projection 22c is formed so that the opposite faces thereof, which are respectively in sliding contact with the side faces of the corresponding linear guide slot 16c, extend parallel to each other. The zoom lens is provided with a first lens holder 22e which encloses the first lens group L1 to hold the same. The first lens holder 22e is fixed to the cylindrical portion 22a of the first lens frame 22 via male and female threads 22f which are formed on an outer peripheral surface of the first lens holder 22e and an inner peripheral surface of the cylindrical portion 22a, respectively. The position of the first lens group L1 relative to the first lens frame 22 in the optical axis direction can be adjusted by varying the amount of engagement between the male and female threads 22f. A wave washer 22h is held between the holder 22e and an inner flange 22g of the first lens frame 22 to remove the play between the first lens holder 22e (or the first lens group L1) and the first lens frame 22 (see FIG. 2).

The second lens frame 23 is provided with three resilient extending pieces 23b which extend forward from an annular plate portion 23a of the second lens frame 23. The three resilient extending pieces 23b are formed on the second lens frame 23 at 120° intervals about the axis of the second lens frame 23. Each resilient extending piece 23b is provided on a radially outer surface thereof with a square projection 23c which extends radially outwards to be fitted in the corresponding linear guide slot 16c in a slidable manner in the optical axis direction. Each resilient extending piece 23b is further provided on top of each square projection 23c with the aforementioned follower pin 23d, which is fixed to the resilient extending piece 23b to extend radially outwards. The square projections 23c and the follower pins 23d of the second lens frame 23 are identical to the square projections 22c and the follower pins 22d of the first lens frame 22 except that the resilient extending pieces 23b of the second lens frame 23 extend in the direction opposite to the resilient extending pieces 22b of the first lens frame 22 in the optical axis direction. The zoom lens is provided with a second lens holder 23e which encloses the second lens group L2 to hold the same. The second lens holder 23e is fixed to the annular plate portion 23a of the second lens frame 23 via set screws 23f. A shutter block 24 is provided around the second lens group L2. The shutter block 24 is fixed to the annular plate portion 23a of the second lens frame 23 via the set screws 23f that are screwed into the rear of the shutter block 24. The shutter block 24 functions to interrupt light bundles which are incident on the CCD 12a at a shutter release operation.

Each of the first and second lens frames 22 and 23 is guided linearly in the optical axis direction without rotating about the optical axis O by the engagement of each of the three square projections 22c and corresponding each of the three square projections 23c with each common corresponding linear guide slot of the three linear guide slots 16c. Each follower pin 22d penetrates the corresponding linear guide slot 16c of the linear guide barrel 16 to be engaged with the corresponding first cam groove 17C1 of the first cam barrel 17, which is fitted on the linear guide barrel 16 to be rotatable about the optical axis relative to linear guide barrel 16. Likewise, each follower pin 23d penetrates the corresponding linear guide slot 16c of the linear guide barrel 16 to be engaged with the corresponding second cam groove 17C2 of the first cam barrel 17. When the first and second lens frames 22 and 23 are placed in the linear guide barrel 16 and the first cam barrel 17, firstly each of the three square projections 22c and corresponding one of the three square projections 23c are inserted into a corresponding linear guide slot of the three linear guide slots 16c from the rear end face of the linear guide barrel 16. At the same time, each of the three follower pins 22d and corresponding one of the three follower pins 23d are inserted into corresponding one of the three insertion grooves 16h to be fitted in the corresponding first and second cam grooves 17C1 and 17C2, respectively. It should be noted that the hatched areas of the first and second cam grooves 17C1 and 17C2 in FIG. 3 are used solely for the purpose of inserting each follower pin 22d or 23d into the corresponding cam groove 17C1 or 17C2 during assembly, and thus are not used when the zoom lens is in operation.

According to the above described guide structure, rotating the rotational barrel 13 about the optical axis O causes the barrel unit which includes the linear guide barrel 16, the first cam barrel 17 and the second cam barrel 18 to move in the optical axis direction. During this movement of the barrel unit, the first and second cam barrels 17 and 18 rotate together about the optical axis O, but the linear guide barrel 16 does not rotate about the optical axis O. As a result, the first lens frame 22 (the first lens group L1) and the second lens frame 23 (the second lens group L2) linearly move in the optical axis direction while changing the space therebetween in accordance with the contours of the first and second cam grooves 17C1 and 17C2 to thereby carry out a zooming operation.

Figure 7:
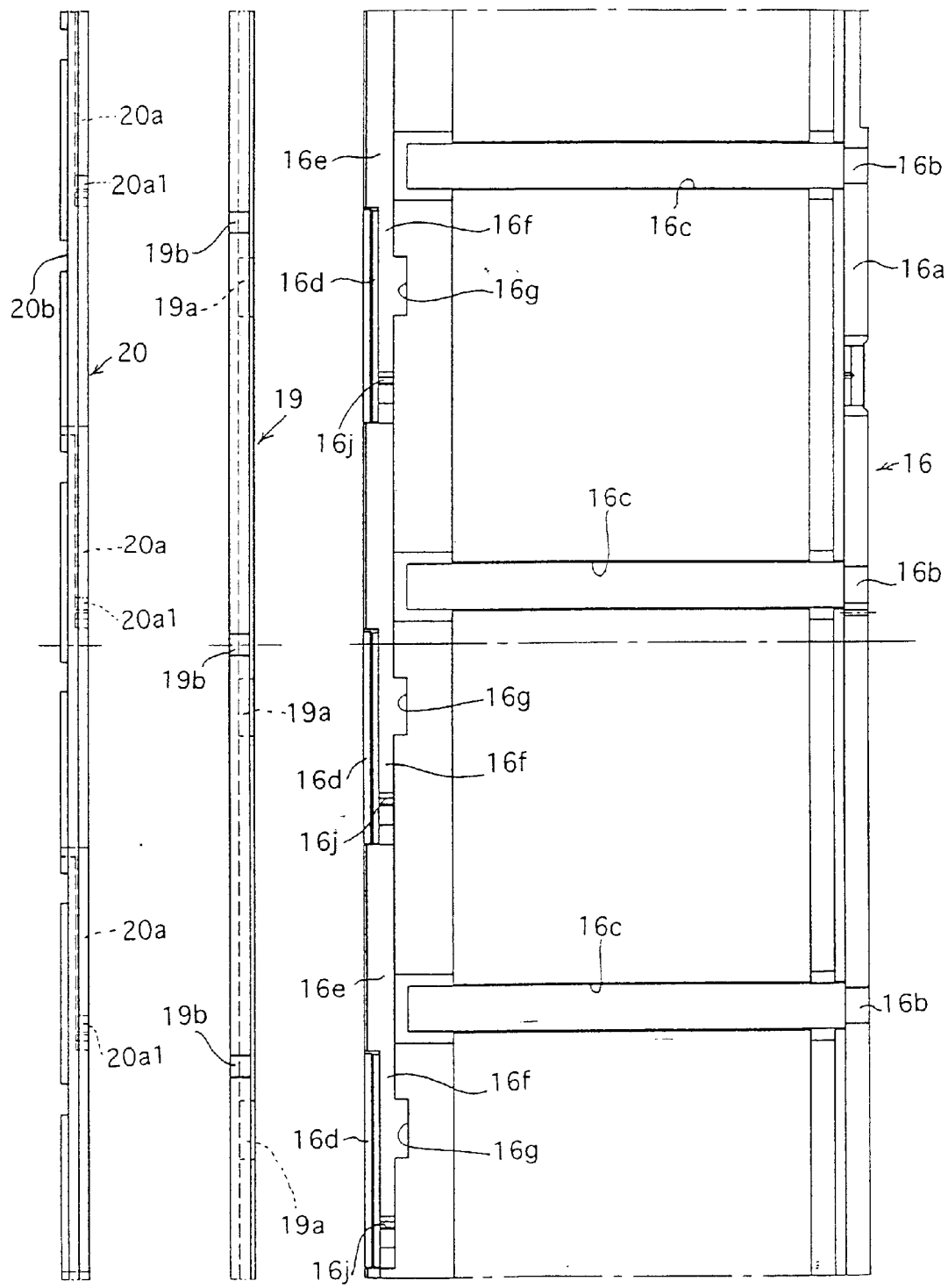
FIG. 7 is a developed view of the linear guide barrel, the linear guide ring and the retainer ring.

The coupling structure of the linear guide ring 19 and the retainer ring 20 to the front end of the linear guide barrel 16 will be hereinafter discussed with reference to FIGS. 6 and 7. The linear guide barrel 16 is provided, at the front end thereof at 120° intervals about the axis of the linear guide barrel 16, with three engaging lugs 16d each of which extends radially outwards. A receiving area 16e is formed between any two adjacent engaging lugs 16d of the linear guide barrel 16 in order to receive one of three radially inward projections 19a of the linear guide ring 19. The linear guide barrel 16 is provided immediately behind the three engaging lugs 16d with three grooves 16f, respectively. The radius of the linear guide barrel 16 from the axis of the linear guide barrel 16 to the bottom surface of each groove 16f is identical to the radius from the axis of the linear guide barrel 16 to the surface of each receiving area 16e. The linear guide barrel 16 is provided behind the three engaging lugs 16d with three recesses 16g, respectively, each of which is connected with the corresponding groove 16f. Each recess 16g is recessed rearward (toward the right as viewed in FIG. 7) in the direction parallel to the optical axis O, i.e., in the optical axis direction.

On the other hand, the linear guide ring 19 is provided with the aforementioned three inward projections 19a at 120° intervals about the axis of the linear guide ring 19. The three inward projections 19a can be inserted into the three receiving areas 16e, respectively. If the linear guide ring 19 is rotated about the axis thereof clockwise as viewed in FIG. 6 relative to the linear guide barrel 16 with the three inward projections 19a being properly inserted into the three receiving areas 16e, respectively, each inward projection 19a slides into the corresponding groove 16f. The linear guide ring 19 is provided with three radially outward projections 19b at 120° intervals about the axis of the linear guide ring 19. The circumferential positions of the three outward projections 19b are precisely determined with reference to the circumferential positions of the three inward projections 19a.

The retainer ring 20 is provided with radially inward blades 20a at 120° intervals about the axis of the retainer ring 20. The three inward blades 20a can be inserted into the three receiving areas 16e of the linear guide barrel 16, respectively. If the retainer ring 20 is rotated about the axis thereof clockwise as viewed in FIG. 6 relative to the linear guide barrel 16 with the three inward blades 20a being properly inserted into the three receiving areas 16e, respectively, each inward blade 20a slides into the corresponding groove 16f. The retainer ring 20 is provided on the front end face thereof with a plurality of grooves 20b which are recessed rearward, toward the linear guide barrel 16, so that a pin face wrench (not shown) can be engaged with the recessed portions 20b to rotate the retainer ring 20 relative to the linear guide barrel 16.

When the linear guide ring 19 is fixed to the front end of the linear guide barrel 16, firstly the three inward projections 19a are respectively inserted into the three receiving areas 16e, and then the linear guide ring 19 is rotated about the axis thereof clockwise as viewed in FIG. 6 relative to the linear guide barrel 16 so that each inward projection 19a slides into the corresponding groove 16f. Subsequently, each inward projection 19a is made to be fitted in the corresponding recess 16g. This engagement of each inward projection 19a with the corresponding recess 16g determines the fixed circumferential position of the linear guide ring 19 relative to the linear guide barrel 16. Subsequently, the inward blades 20a of the retainer ring 20 are respectively inserted into the three receiving areas 16e, and then the retainer ring 20 is rotated about the axis thereof clockwise as viewed in FIG. 6 relative to the linear guide barrel 16 so that each inward blade 20a slides into the corresponding groove 16f and presses the corresponding inward projection 19a into the corresponding recess 16g. This prevents the linear guide ring 19 from moving in the optical axis direction relative to the linear guide barrel 16. In this state, since each of the three inward blades 20a of the retainer ring 20 is held in one of the three grooves 16f between the corresponding engaging lug 16d and the corresponding inward projection 19a, the inward blades 20a and the engaging lugs 16d function to prevent the linear guide ring 19 from coming off the front end of the linear guide barrel 16. Between the linear guide barrel 16 and the retainer ring 20 is provided a click-stop device which prevents the retainer ring 20 from rotating counterclockwise as viewed in FIG. 6 so that the retainer ring 20 cannot come off the front end of the linear guide barrel 16 after the retainer ring 20 is properly engaged with the linear guide barrel 16. Three indentations 20a1 which are formed on the retainer ring 20 and corresponding three detents 16j which are formed on the linear guide barrel 16 to be respectively engaged with the three indentations 20a1 constitute the elements of the click-stop device (see FIGS. 6 and 7).

Accordingly, the outward projections 19b of the linear guide ring 19 that is fixed to the front end of the linear guide barrel 16 in the above described manner are located at predetermined specific positions (angular positions) relative to the linear guide projections 16b. The zoom lens is provided at the front thereof with an external barrel (a hood barrel) 25(L). The external barrel 25 is provided, on an inner peripheral surface thereof at 120° intervals about the axis of the external barrel 25, with three linear guide grooves 25a which extend parallel to the optical axis O. The three outward projections 19b of the linear guide ring 19 are respectively engaged with the three linear guide grooves 25a to guide the external barrel 25 to move in the optical axis direction without rotating about the optical axis O. The external barrel 25 is provided at the rear end thereof with three radially inward pins 25b which are respectively engaged with three guide grooves 18b formed on outer peripheral surface of the second cam barrel 18 at 120° intervals about the axis thereof.

Figure 8:
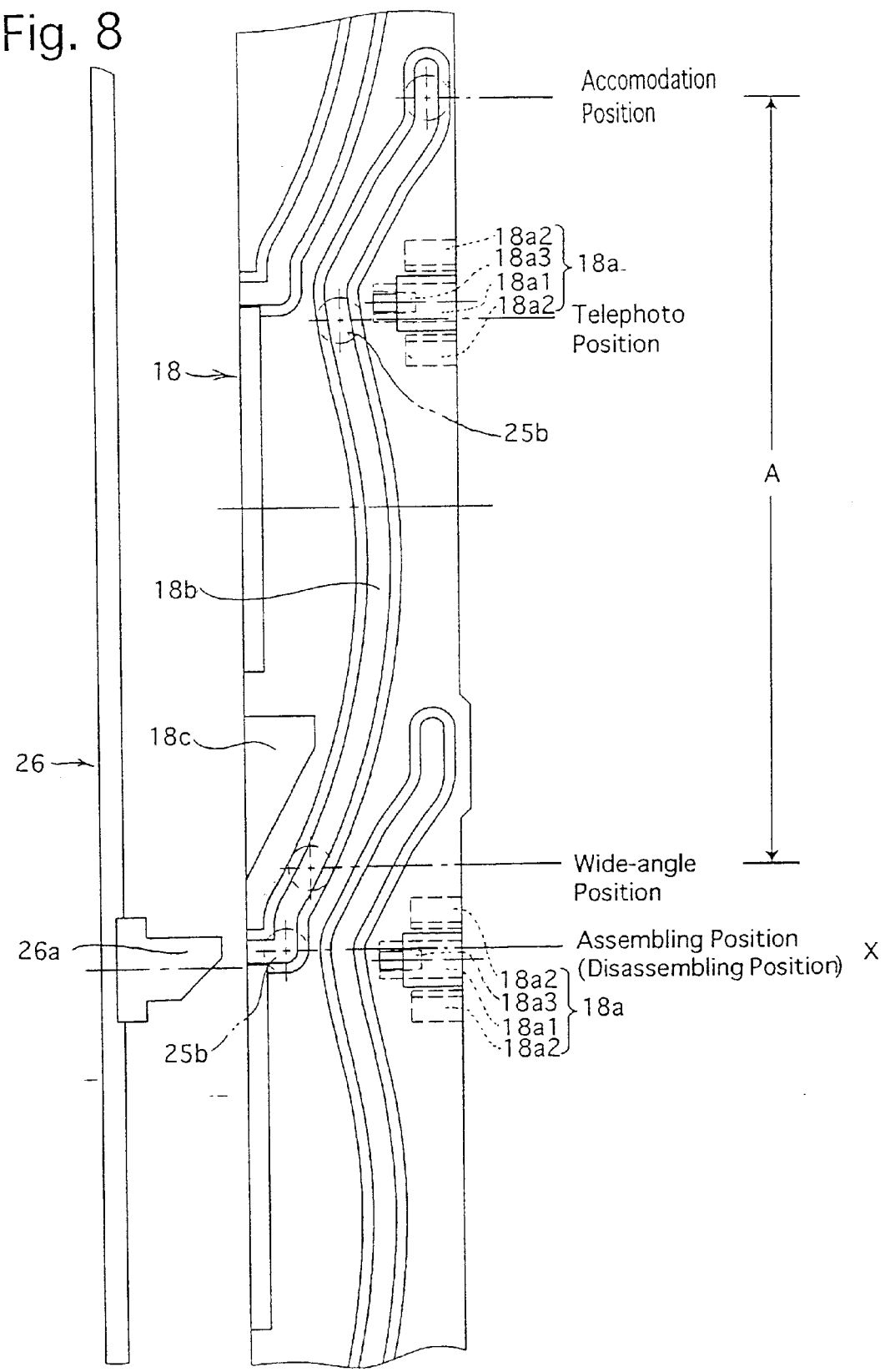
FIG. 8 is a developed view of a second cam barrel and a barrier drive ring, showing the positional relationship therebetween when the zoom lens is set at the telephoto extremity thereof (when the zoom lens is in a ready-to-photograph state)

As shown in FIG. 8, each of the three guide grooves 18b of the second cam barrel 18 defines an assembling position (or a disassembling position) X at which the three inward pins 25b of the external barrel 25 are respectively inserted into or taken out of the three guide grooves 18b of the second cam barrel 18. Each of the three guide grooves 18b further defines an accommodation position, a telephoto position and a wide-angle extremity position, which determine the accommodation position, the telephoto extremity and the wide-angle extremity of the first cam barrel 17, respectively. The three guide grooves 18b are formed to move the external barrel 25 in the optical axis direction in accordance with the rotational position of the second cam barrel 18, which rotates together with the first cam barrel 17. More specifically, the three guide grooves 18b are formed to make the external barrel 25 function as a movable lens hood so that the external barrel 25 advances relative to the second cam barrel 18 (i.e., the first lens group L1) when the zoom lens is set at the telephoto extremity thereof having a narrow angle of view while the external barrel 25 retreats relative to the second cam barrel 18 when the zoom lens is set at the wide-angle extremity thereof having a wide angle of view. The external barrel 25 is positioned in the wide-angle extremity thereof and the telephoto extremity thereof in FIG. 10 and FIG. 11, respectively.

If the external barrel 25 is pressed rearward (i.e., toward the camera body) by an external force when the camera is in use, the compression springs 21 function as shock absorbers which can absorb at least part of such an external force since the compression springs 21 are positioned between the first cam barrel 17, which guides the first and second lens groups L1 and L2 in the optical axis direction, and the second cam barrel 18, which guides the external barrel 25 in the optical axis direction. Such an external force is transmitted partly to the first cam barrel 17 after having been absorbed to some extent by the compression springs 21, which prevents large external forces from being applied to the first cam barrel 17. Consequently, the precision of the axial position of each of the first and second lens groups L1 and L2 is influenced negligibly by external forces applied to the external barrel 25. In FIG. 2, the reference numeral 29(F) designates a stationary external barrel which is integral with the camera body. The external barrel 25 advances and retreats with respect to the stationary external barrel 29.

Figure 13:
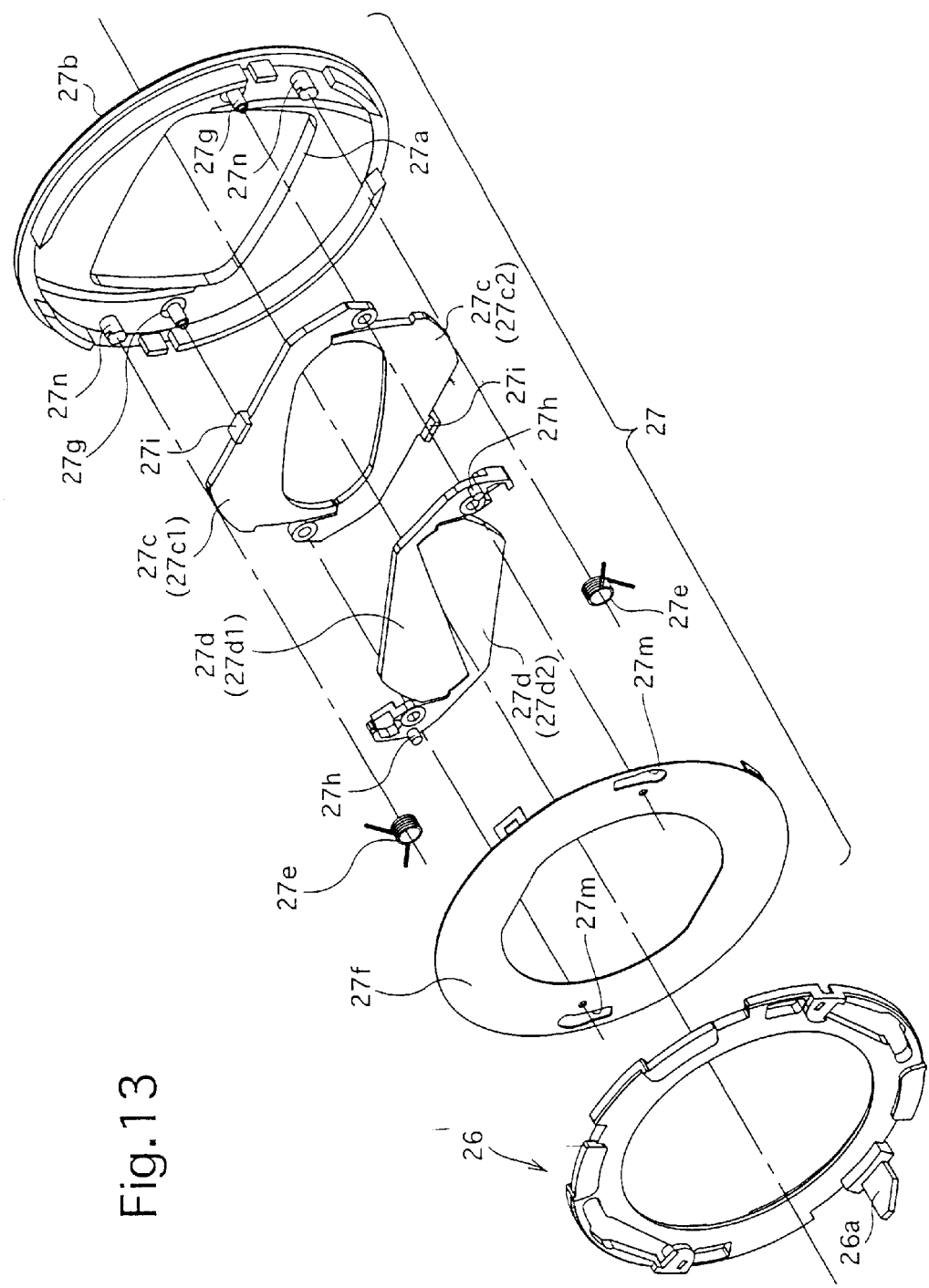
FIG. 13 is an exploded perspective view of the barrier block, viewed from behind the barrier block.
Figure 15A:
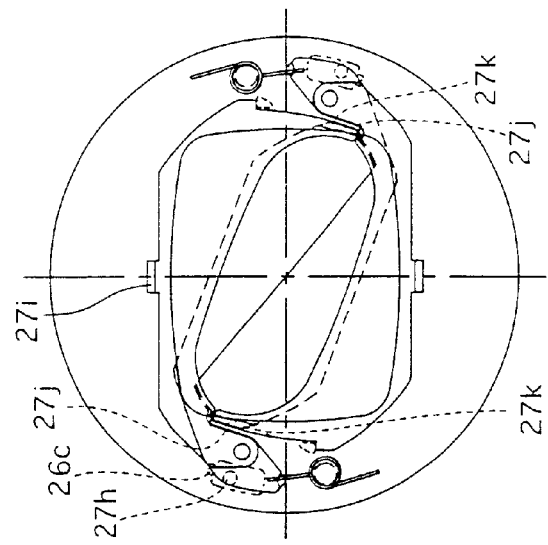
FIG. 15A is a schematic front view of the barrier block, showing two pairs of barrier blades in a fully open position.
Figure 15B:
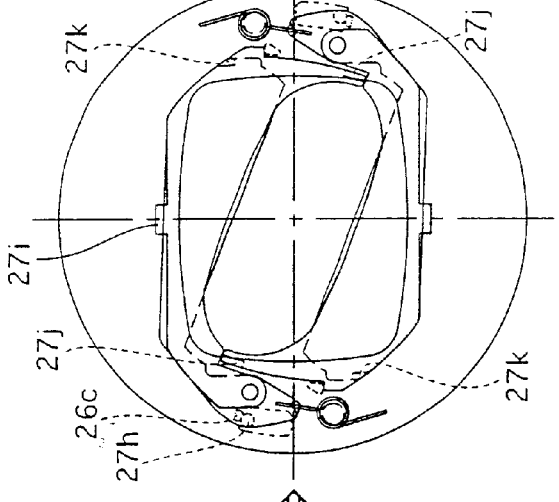
FIG. 15B is a schematic front view of the barrier block, showing the two pairs of barrier blades in a half-closed position.
Figure 15C:
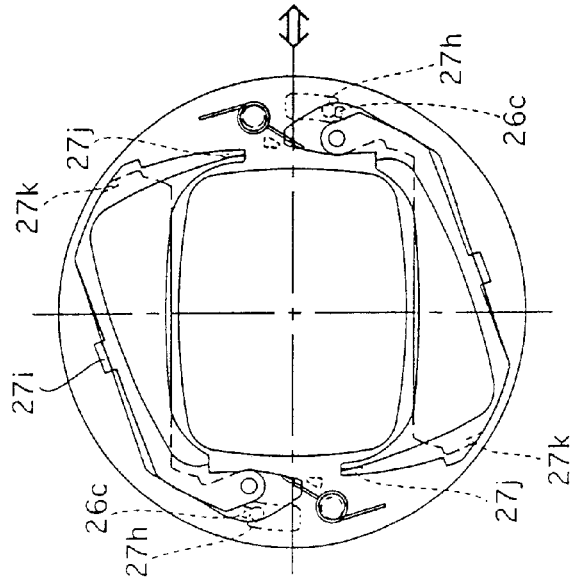
FIG. 15C is a schematic front view of the barrier block, showing the two pairs of barrier blades in a fully closed position.

The external barrel 25 is provided, at the front thereof in the radially inner side of the external barrel 25, with a barrier drive ring 26, so that the barrier drive ring 26 can rotate about the optical axis O. The barrier drive ring 26 functions to open and close two pairs of barrier blades 27c and 27d (i.e. the front pair of barrier blades 27c and the rear pair of barrier blades 27d) by rotating about the optical axis O. The two pairs of barrier blades 27c and 27d together function as a lens protection cover for protecting the front surface of the first lens group L1 from getting scratched, etc., when the digital camera is not in use. The barrier block 27 is provided with a panel 27b having a photographic aperture 27a, the aforementioned two pairs of barrier blades 27c and 27d supported by the panel 27b there behind to open and close the photographic aperture 27a, and two torsion springs 27e which constantly bias the two pairs of barrier blades 27c and 27d in a direction to close the photographic aperture 27a. The barrier block 27 is further provided with an annular pressure plate 27f which holds the two pairs of barrier blades 27c and 27d and the torsion springs 27e between the panel 27b and the pressure plate 27f. The barrier block 27 having such elements is assembled in advance as a unit. The panel 27b is provided on a rear face thereof with two pivots 27g (see FIGS. 13 and 14) and two engaging pins 27n. The upper front barrier blade 27c1 of the front pair of barrier blades 27c and the upper rear barrier blade 27d1 of the rear pair of barrier blades 27d are pivoted at corresponding one of the two pivots 27g (the right pivot 27g as viewed in FIG. 13), while the lower front barrier blade 27c2 of the front pair of barrier blades 27c and the lower rear barrier blade 27d2 of the rear pair of barrier blades 27d are pivoted at the other pivot 27g (the left pivot 27g as viewed in FIG. 13). Each of the rear pair of barrier blades 27d is constantly biased to rotate in a direction to close the photographic aperture 27a of the panel 27b by the corresponding torsion spring 27e whose coil portion is fitted on the corresponding engaging pin 27n. Each of the rear pair of barrier blades 27d is provided in the vicinity of the pivoted portion thereof with a driven pin 27h that is driven to open the corresponding rear barrier blade 27d against the spring force of the corresponding torsion spring 27e. Each of the front pair of barrier blades 27c is provided on an outer edge thereof with an engaging projection 27i which extends rearward to be engaged with the outer edge of the corresponding rear barrier blade 27d so that the engaging projection 27i of each of the front pair of barrier blades 27c comes into engagement with the outer edge of the corresponding rear barrier blade 27d to rotate the corresponding front barrier blade 27c in the direction to open the photographic aperture 27a together with the corresponding rear barrier blade 27d when the corresponding rear barrier blade 27d is driven to rotate in the direction to open the photographic aperture 27a. The upper front barrier blade 27c1 is provided on a rear surface thereof with an engaging projection 27j, while the upper rear barrier blade 27d1 is provided on a front surface thereof with an engaging projection 27k (see FIGS. 15A, 15B and 15C). When the upper rear barrier blade 27d1 is driven to rotate in the direction to close the photographic aperture 27a, the engaging projection 27k of the upper rear barrier blade 27d1 is engaged with the engaging projection 27j of the upper front barrier blade 27c1 to drive the upper front barrier blade 27c1 to rotate in the direction to close the photographic aperture 27a together with the upper rear barrier blade 27d1. Likewise, the lower front barrier blade 27c2 is provided on a rear surface thereof with an engaging projection 27j, while the lower rear barrier blade 27d2 is provided on a front surface thereof with an engaging projection 27k (see FIGS. 15A, 15B and 15C). When the lower rear barrier blade 27d2 is driven to rotate in the direction to close the photographic aperture 27a, the engaging projection 27k of the lower rear barrier blade 27d2 is engaged with the engaging projection 27j of the lower front barrier blade 27c2 to drive the lower front barrier blade 27c2 to rotate in the direction to close the photographic aperture 27a together with the lower rear barrier blade 27d2.

The pressure plate 27f is provided with two slots 27m through which the two drive pins 27h of the rear pair of barrier blades 27d penetrate toward the barrier drive ring 26, respectively.

Figure 16:
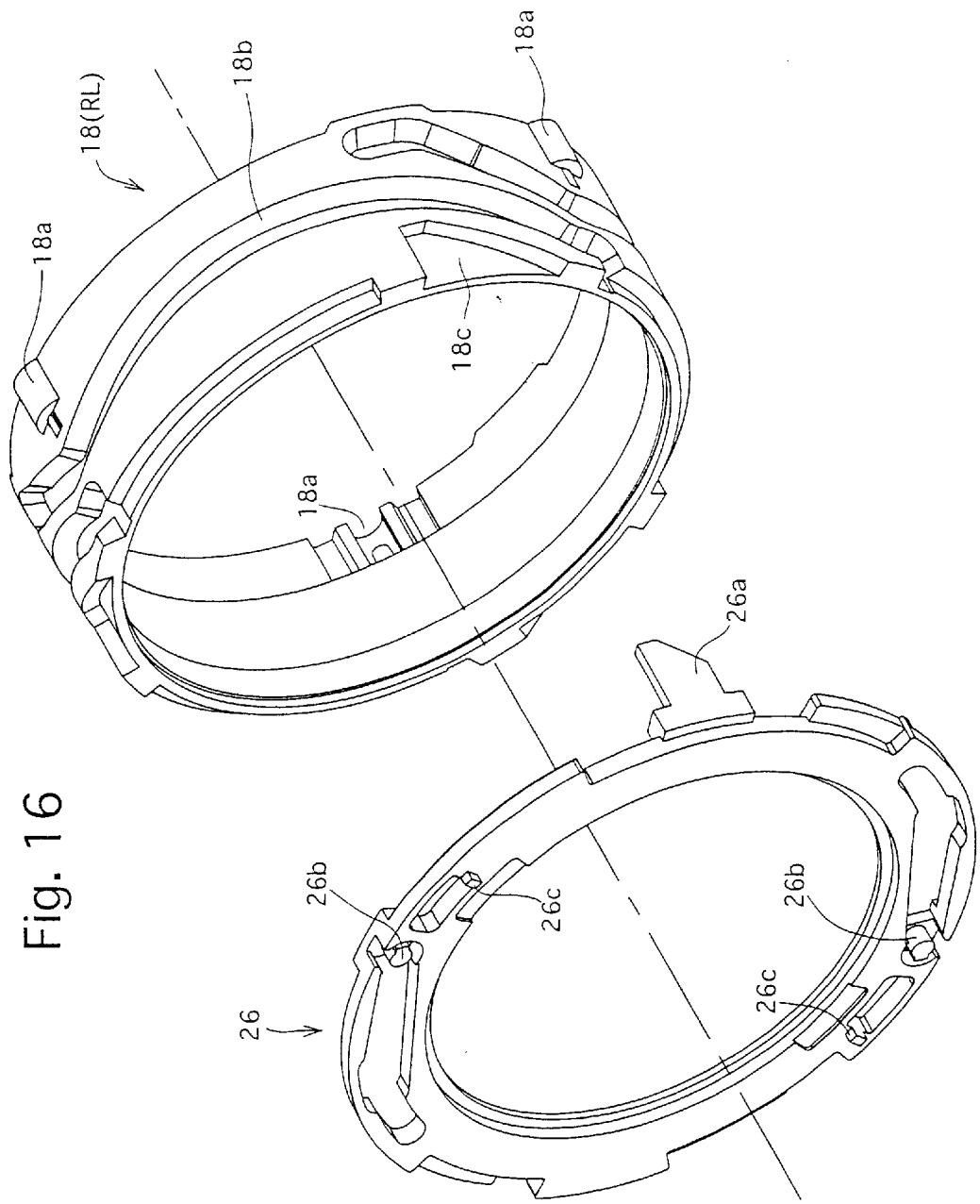
FIG. 16 is a perspective view of the second cam barrel and the barrier drive ring, showing the positional relationship between a driven lever which extends from the barrier drive ring and a rotation transfer recess formed on the second cam barrel.

The barrier drive ring 26 is provided on the front thereof with two protrusions 26b, while the external barrel 25 is provided in the vicinity of the front end thereof with corresponding two protrusions 25c (see FIGS. 16, 17 and 18). Two helical extension springs 28 are positioned between the external barrel 25 and the barrier drive ring 26 so that one and the other ends of one helical extension spring 28 are hooked on one of the two protrusions 26b and corresponding one of the two protrusions 25c, respectively, and one and the other ends of the other helical extension spring 28 are hooked on the other protrusion 26b and the other protrusion 25c, respectively. The spring force of each helical extension spring 28 is stronger than the spring force of each torsion spring 27e. The barrier drive ring 26 is constantly biased by the two helical extension springs 28 to rotate in the direction to open the two pairs of barrier blades 27c and 27d. The barrier drive ring 26 is provided on the front thereof with two protrusions 26c which can be respectively engaged with the two drive pins 27h of the rear pair of barrier blades 27d to open the two pairs of barrier blades 27c and 27d. When the barrier drive ring 26 is rotated to the rotational limit thereof by the spring force of the helical extension springs 28, each of the two protrusions 26c is engaged with the corresponding driven pin 27h to push the same in the direction to open the corresponding rear barrier blade 27d against the spring force of the corresponding torsion spring 27e, so that the corresponding front barrier blade 27c also opens via the engaging projection 27i thereof (see FIGS. 15A, 15B and 15C).

Figure 9:
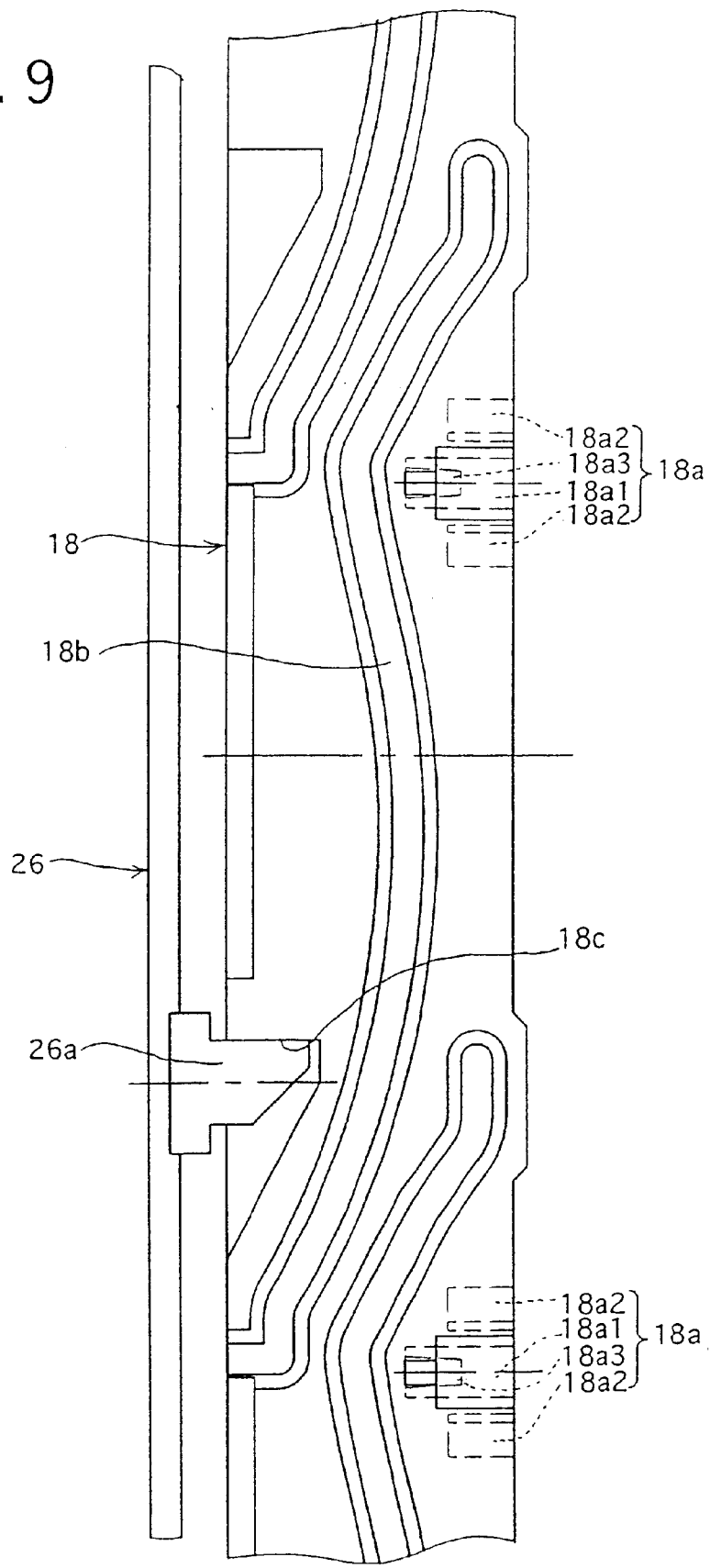
FIG. 9 is a developed view of the second cam barrel and the barrier drive ring, showing the positional relationship therebetween when the zoom lens is positioned in the accommodation position (when the power of the zoom lens is turned OFF)

On the other hand, the barrier drive ring 26 is provided with a driven lever 26a which extends from the rim of the barrier drive ring 26 toward the second cam barrel 18 to be engaged with, and disengaged from, a rotation transfer recess 18c formed on an outer peripheral surface of the second cam barrel 18 (see FIGS. 8, 9 and 16). Since the barrier drive ring 26 is supported by the external barrel 25 to be rotatable about the optical axis O relative to the external barrel 25, but immovable in the optical axis direction relative to the external barrel 25, the barrier drive ring 26 moves toward and away from the rotating second cam barrel 18 if the external barrel 25 linearly moves in the optical axis direction due to the engagement of the inward pins 25b of the external barrel 25 with the guide grooves 18b of the second cam barrel 18 as can be seen in FIGS. 8 and 9. The driven lever 26a and the rotation transfer recess 18c are apart from each other when positioned within a photographing range (i.e., between the telephoto extremity and the wide-angle extremity) as shown in FIG. 8. When the zoom barrel retreats from the telephoto extremity thereof to the accommodation position thereof, the driven lever 26a approaches the rotation transfer recess 18c and is then engaged with the rotation transfer recess 18c to apply a force to the barrier drive ring 26 to rotate the same in the direction to close the two pairs of barrier blades 27c and 27d. When the barrier drive ring 26 rotates to the rotational limit thereof against the spring force of the helical extension springs 28, each of the protrusions 26c of the barrier drive ring 26 disengages from the drive pins 27h of the corresponding rear barrier blade 27d. As a result, each of the rear pair of barrier blades 27d closes by the spring force of the corresponding torsion spring 27e, so that each of the front pair of barrier blades 27c also closes via the corresponding engaging projections 27j and 27k to thereby close the photographic aperture 27a (see FIG. 14). Conversely, when the zoom barrel advances from the accommodation position thereof to the telephoto extremity thereof, the driven lever 26a moves forwards and then disengages from the rotation transfer recess 18c to thereby allow the barrier drive ring 26 to rotate in the direction to open the two pairs of barrier blades 27c and 27d by the spring force of the helical extension springs 28. As a result, each of the protrusions 26c of the barrier drive ring 26 is engaged with the drive pin 27h of the corresponding rear barrier blade 27d to push the same in the direction to open the corresponding front barrier blade 27c via the corresponding engaging projection 27i to thereby open the two pairs of barrier blades 27c and 27d. Accordingly, as can be understood by the above description, the two pairs of barrier blades 27c and 27d are driven to open and close by rotation of the barrier drive ring 26. It should be noted that the barrier drive ring 26 has only one driven lever 26a, whereas the second cam barrel 18 has three rotation transfer recesses 18c formed at 120° intervals about the axis of the second cam barrel 18. One rotation transfer recess 18c which is actually used is freely selected from the three rotation transfer recesses 18c during assembly.

Figure 10:
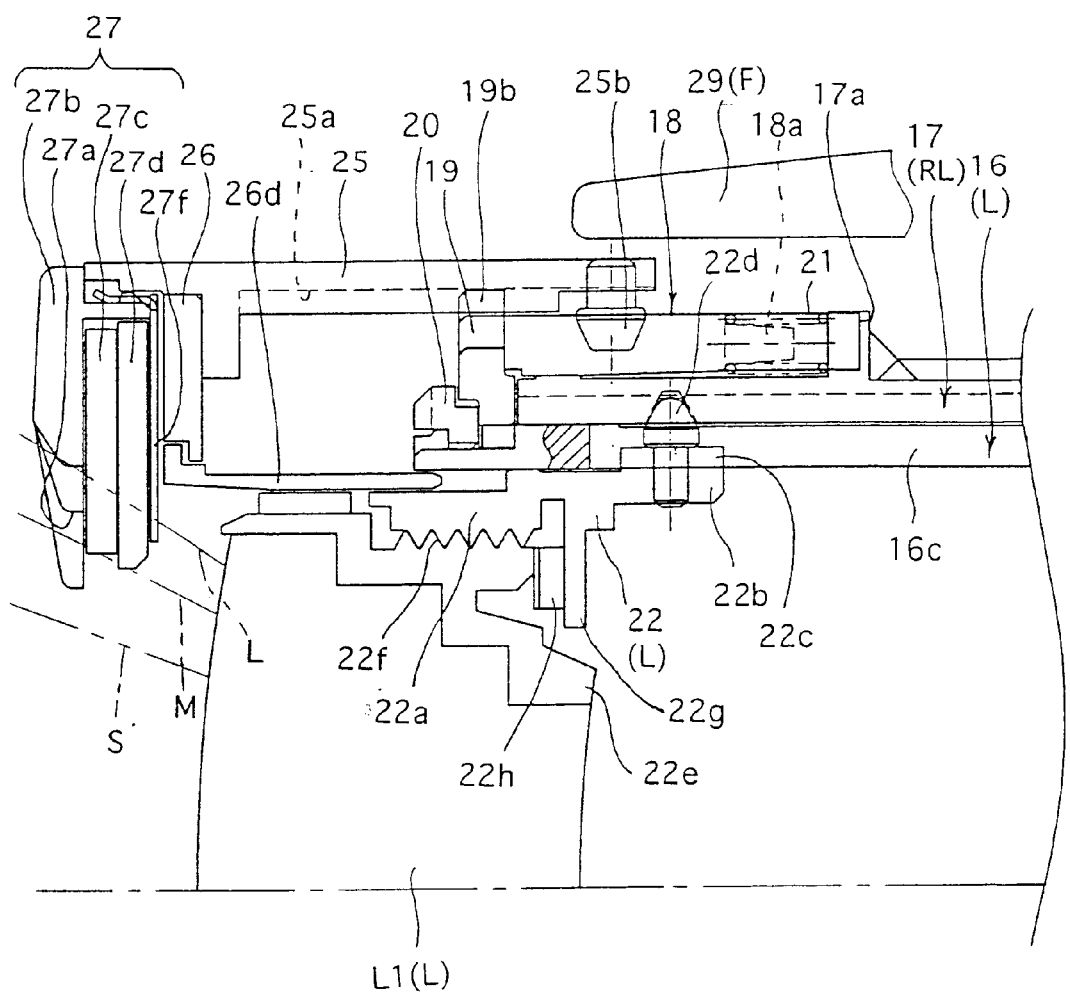
FIG. 10 is an axial cross sectional view of the zoom lens show in FIG. 1, showing the zoom lens above the optical axis thereof, showing the positional relationship between an external barrel and the second cam barrel (a first lens group) when the zoom lens is set at the wide-angle extremity thereof.
Figure 11:
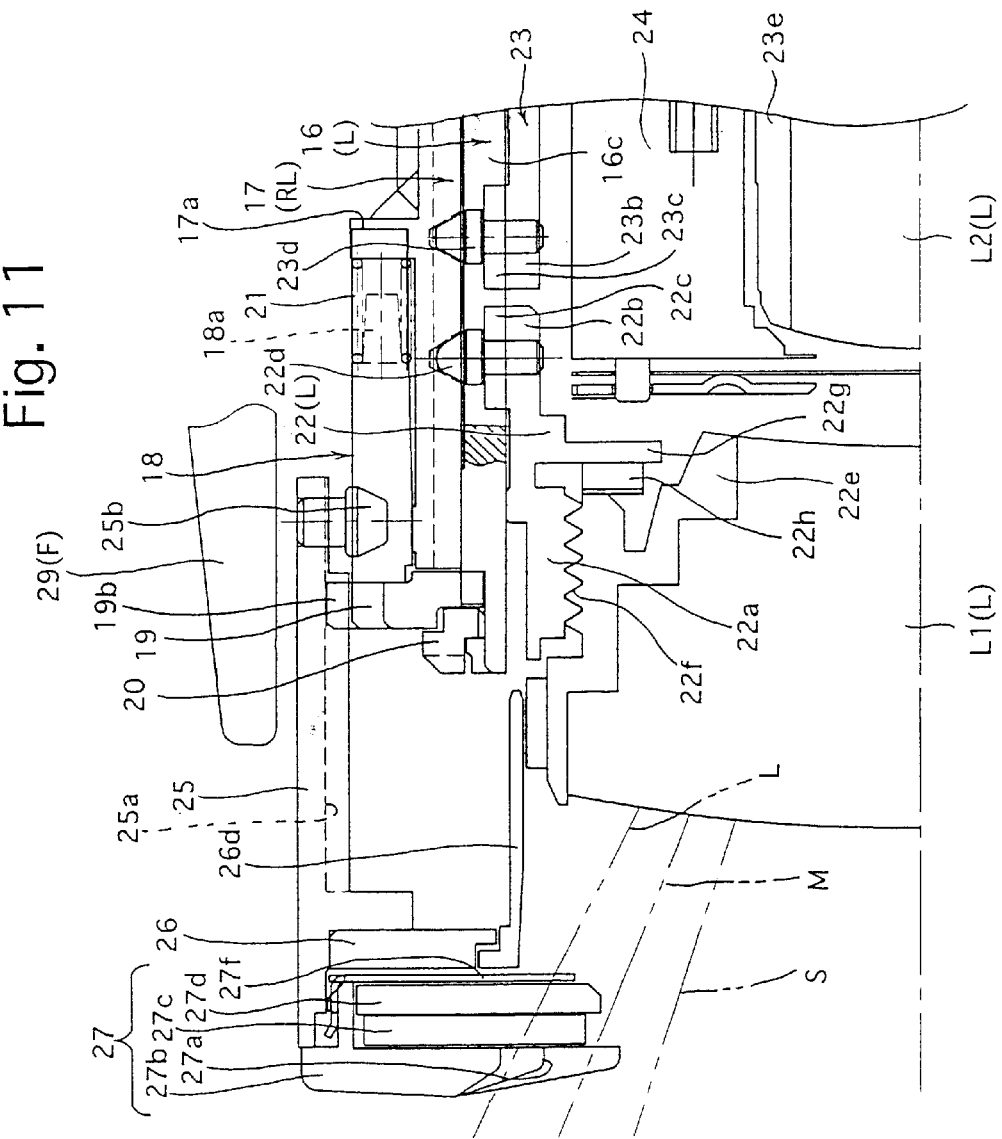
FIG. 11 is an axial cross sectional view of the zoom lens show in FIG. 1, showing the zoom lens above the optical axis thereof, and showing the positional relationship between the external barrel and the second cam barrel (the first lens group) when the zoom lens is set at the telephoto extremity thereof.
Figure 12:
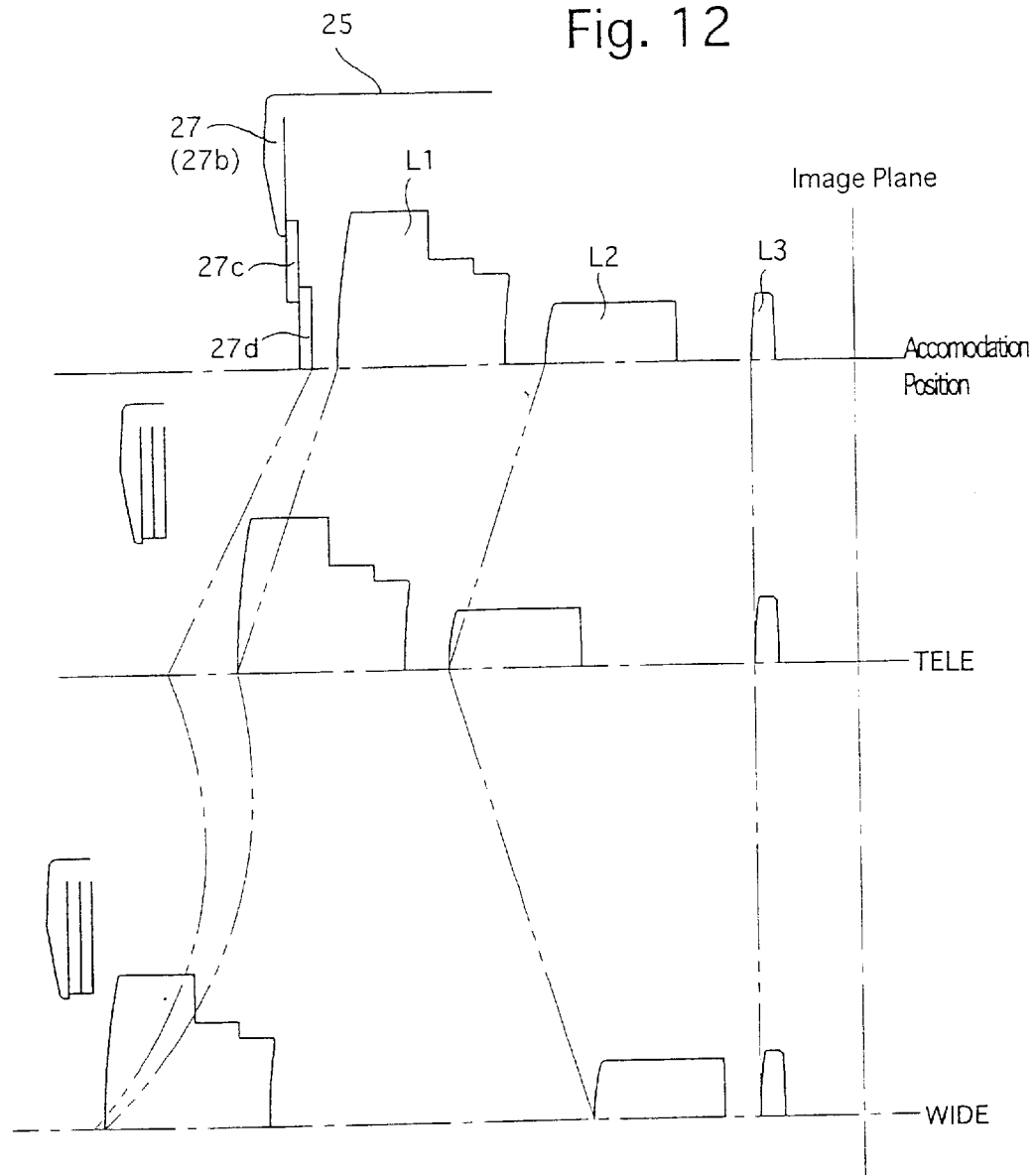
FIG. 12 is an explanatory view showing variations in axial position of the sensitive surface (image plane) of a CCD, the first lens group, a second lens group, and a barrier block when the zoom lens is driven from the accommodation position to the telephoto extremity and thereafter to the wide-angle extremity.

The external barrel 25 that is guided in the optical axis direction moves forward and rearward in the optical axis direction by rotation of the second cam barrel 18 in the above described manner. On the other hand, the first and second lens groups L1 and L2 move forward and rearward in the optical axis direction by rotation of the first cam barrel 17. FIG. 12 shows the axial position of the sensitive surface (image plane) of the CCD 12a on which subject images are formed through the photographic optical system, and the variations in the axial positions of the first lens group L1 (the principal point of the first lens group L1), the second lens group L2 (the principal point of the first lens group L2), and the barrier block 27 fixed to the front end of the external barrel 25 (more specifically, the photographic aperture 27a formed on the panel 27b of the barrier block 27), when the zoom lens is driven from the accommodation position to the wide-angle extremity via the telephoto extremity. The contours of the first and second cam grooves 17C1 and 17C2 of the first cam barrel 17 and the guide grooves 18b of the second cam barrel 18 are determined so that, the first lens group L1, the second lens group L2 and the barrier block 27 move in the optical axis direction to have the moving paths shown in FIG. 12. The photographic aperture 27a has a generally rectangular shape as viewed from the front of the digital camera. The angle of view in the diagonal direction of the photographic aperture 27a is greater than the angle of view in the lateral (horizontal) direction of the photographic aperture 27a, while the angle of view in the lateral direction of the photographic aperture 27a is greater than the angle of view in the longitudinal (vertical) direction of the photographic aperture 27a. In FIG. 10, an incident light ray S on the zoom lens along the angle of view in the longitudinal direction of the photographic aperture 27a, an incident light ray M on the zoom lens along the angle of view in the lateral direction of the photographic aperture 27a, and an incident light ray L on the zoom lens along the angle of view in the diagonal direction of the photographic aperture 27a are shown by two-dot chain lines.

A light shield barrel 26d which extends from the inner edge of the barrier drive ring 26 to the front end of the outer peripheral surface of the first lens frame 22 is adhered to the inner edge of the barrier drive ring 26 by an adhesive. The light shield barrel 26d is rotationally symmetrical about the optical axis O, so that the shielding characteristics of the light shield barrel 26d do not vary even if the light shield barrel 26d rotates forwardly and reversely together with the barrier drive ring 26 about the optical axis O.

Almost all the above mentioned elements of the zoom lens except for each spring, the feed screw 10e, the set screws 23f, the follower pins 22d, the follower pins 23d, the shutter block 24, the radially inward pins 25b, the flexible coding plate 14 and the brush 15 are made of synthetic resin. Although each lens element of the first, second and third lens groups L1, L2 and L3 can be made of a plastic, at least the frontmost lens element is preferably a glass lens for the purpose of preventing the front surface of the first lens group L1 from being scratched.

In the above illustrated embodiment, although the third lens group L3 functions as focusing lens group, the zoom lens can be modified so that the first lens group L1 or the second lens group L2 functions as focusing lens group. In the case where the second lens group L2 functions as focusing lens group, the shutter block can be modified to have an auto-focusing function. Such a shutter block is well-known in the art.

FEATURES OF THE PRESENT INVENTION

In the zoom lens barrel as constructed above, the three linear guide grooves 11c of the stationary barrel 11 extending in parallel with the optical axis, the three linear guide projections 16b and three linear guide slots 16c of the linear guide barrel 16, the three first and second cam grooves 17C1 and 17C2 formed on the first cam barrel 17, and the three square projections 22c and 23c and the follower pins 22d, 23d, formed on the first and second lens frames 22 and 23 are all spaced at 120° degree intervals about the optical axis.

Therefore, firstly, the relative angular position of assembly of the first cam barrel 17 and the linear guide barrel 16 can be selected from three angular positions occurring at 120 degree intervals, upon assembly; and secondly, it is possible to engage the male helicoid 17b of the first cam barrel 17 with the female helicoid 11b of the stationary barrel 11 and to engage the three linear guide projections 16b of the linear guide barrel 16 in the three linear guide grooves 11c of the stationary barrel 11 at one angular position selected from the three angular positions, while maintaining the selected relative angular position of the assembly of the first cam barrel 17 and the linear guide barrel 16.

The following advantages can be expected from the selectability of the assembly position. Upon assembling the zoom lens barrel, the first lens frame 22 and the second lens frame 23 are fitted to the assembly of the first cam barrel 17 and the linear guide barrel 16 from the rear end thereof. Namely, the square projections 22c and 23c are fitted in the linear guide slots 16c of the linear guide barrel 16, and at the same time, the follower pins 22d and 23d are fitted in the first and second cam grooves 17C1 and 17C2 of the first cam barrel 17. The relative angular position of the assembly of the first cam barrel 17 and the linear guide barrel 16 can be selected from among the three angular positions occurring at 120 degree intervals before the first and second lens frames 22 and 23 are fitted. The positioning precision of the components made of a resin mold, to be provided at three angular positions spaced at 120 degree intervals, depends on the dimensional precision of molding dies, so that slight position errors (e.g., a few seconds) may occur. Moreover, the position errors may be cumulated or cancelled depending on the relative angular position of the assembly of the first cam barrel 17 and the linear guide barrel 16, thus resulting in an influence on the optical performance characteristics. In particular, in a digital camera in which the deviation or inclination of the lens axes of the lens groups is not acceptable or not negligible, the above-mentioned problems would be serious. It is possible to select an optimum relative angular position of the assembly of the first cam barrel 17 and the linear guide barrel 16, in which the position errors can be effectively cancelled, from among the three angular positions spaced at 120 degree intervals.

The first and second cam grooves 17C1 and 17C2, and indicia 17e of the first cam barrel 17, and the follower pins 22d and 23d, constitute one example of a selectable assembling device (see FIG. 4).

In the assembly which includes the first cam barrel 17 and the linear guide barrel 16 in which the first lens frame 22 and the second lens frame 23 are incorporated, the male helicoid 17b of the first cam barrel 17 is engaged with the female helicoid 11b of the stationary barrel 11 and the three linear guide projections 16b of the linear guide barrel 16 are engaged with the three linear guide grooves 11c of the stationary barrel 11 while maintaining the selected relative angular position. The assembly which includes the first cam barrel 17 and the linear guide barrel 16 can be engaged with the stationary barrel 11 at any one of the three angular positions spaced at 120 degree intervals. Thus, an optimum assembly position in which the deviation or inclination of the lens axes of the lens groups is eliminated or reduced can be selected for the same reason as mentioned above.

Figure 19:
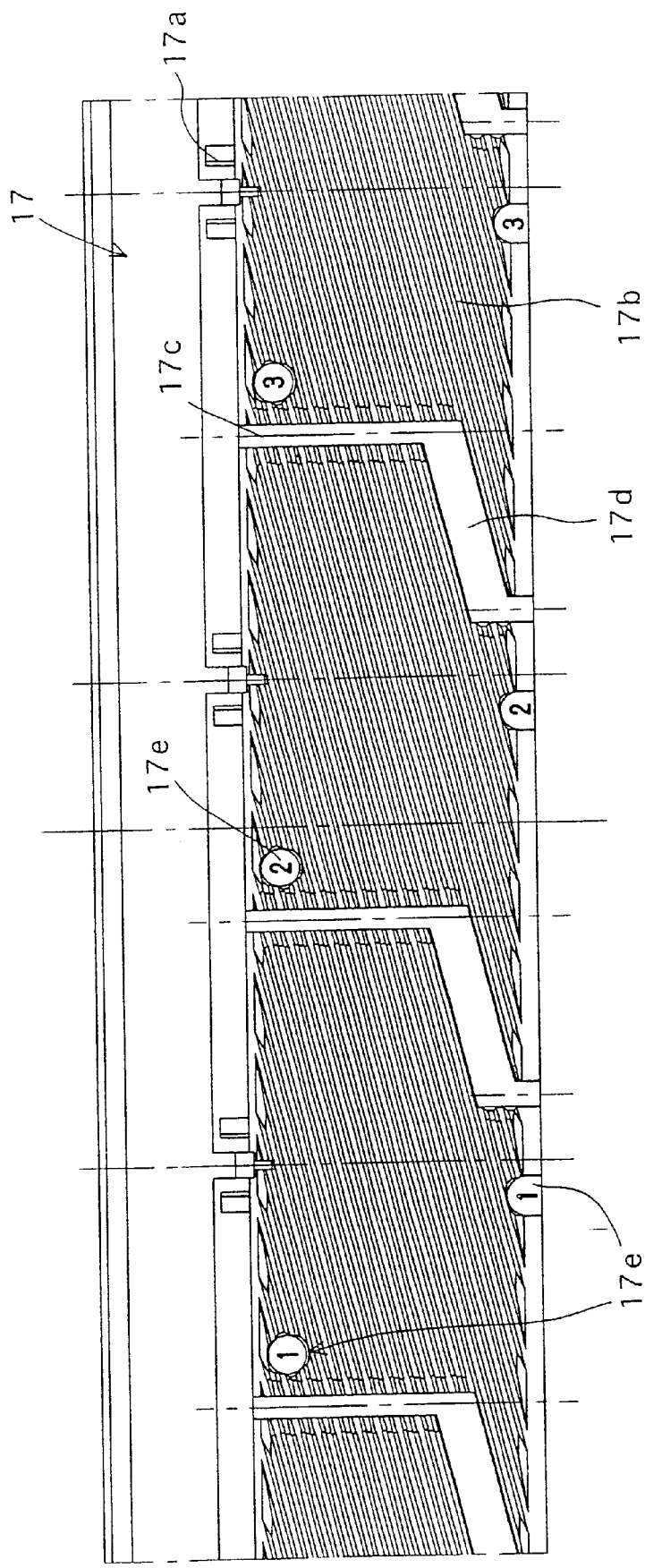
FIG. 19 is a developed view of a first cam barrel.

In theory, the selection of the assembly position can be carried out for each zoom lens barrel, by measuring the optical performance at each assembly position. On the assumption that the manufacturing precision (tendency of error) of the components is substantially constant for the same molding dies, it is more practicable to assemble the components of the zoom lens barrel produced by the same molding dies, in accordance with the same criterion, with reference to indicia provided on the components to represent the relative angular position. In FIG. 19, the first cam barrel 17 is provided with indicia 17e which represent the assembly angular positions spaced at 120 degree intervals. The indicia 17e are provided on the molding dies as corresponding projections and depressions. Similar indicia are preferably provided on the linear guide barrel 16.

The selection of the assembly position can be applied to the assembly of the first and second lens frames 22 and 23 with respect to the linear guide barrel 16 and the first cam barrel 17. Namely, the lens frames 22 and 23 can be assembled with the linear guide barrel 16 and the first cam barrel 17 at three selectable angular positions spaced at 120 degree intervals about the optical axis. Thus, an optimum angular position in which the optimum optical properties can be obtained can be selected. Indicia (not shown) similar to the indicia 17e of the first cam barrel 17 can be provided on the first and second lens frames 22 and 23.

Although the above mentioned discussion has been directed to an embodiment of the invention applied to a zoom lens barrel for a digital camera, the present invention can be equally applied to a lens shutter type camera.

As can be understood from the above discussion, according to the present invention, in a zoom lens barrel in which a plurality of lens groups are moved in the optical axis direction in accordance with the rotation of the first cam barrel having cam grooves, an assembling device can be provided, in which an appropriate assembly position can be selected, in which deviation of the lens axes of the plural lens groups tends not to occur even if the components thereof have manufacturing errors.

FIGS. 20 through 23 show a flexible circuit board guide device to which an embodiment of the present invention is applied. The shutter block 24 secured to the annular plate portion 23a of the second lens frame 23 by the set screws 23f is provided with a flexible circuit board (FPC) 24a which is adapted to supply operation signals to the shutter block 24. The FPC 24a is connected at its one end to the shutter block 24, and is provided on the other end with a connector portion 24b to be connected to a substrate. The shutter block 24 is linearly moved in the optical axis direction in accordance with the zooming operation without rotating.

Figure 23:
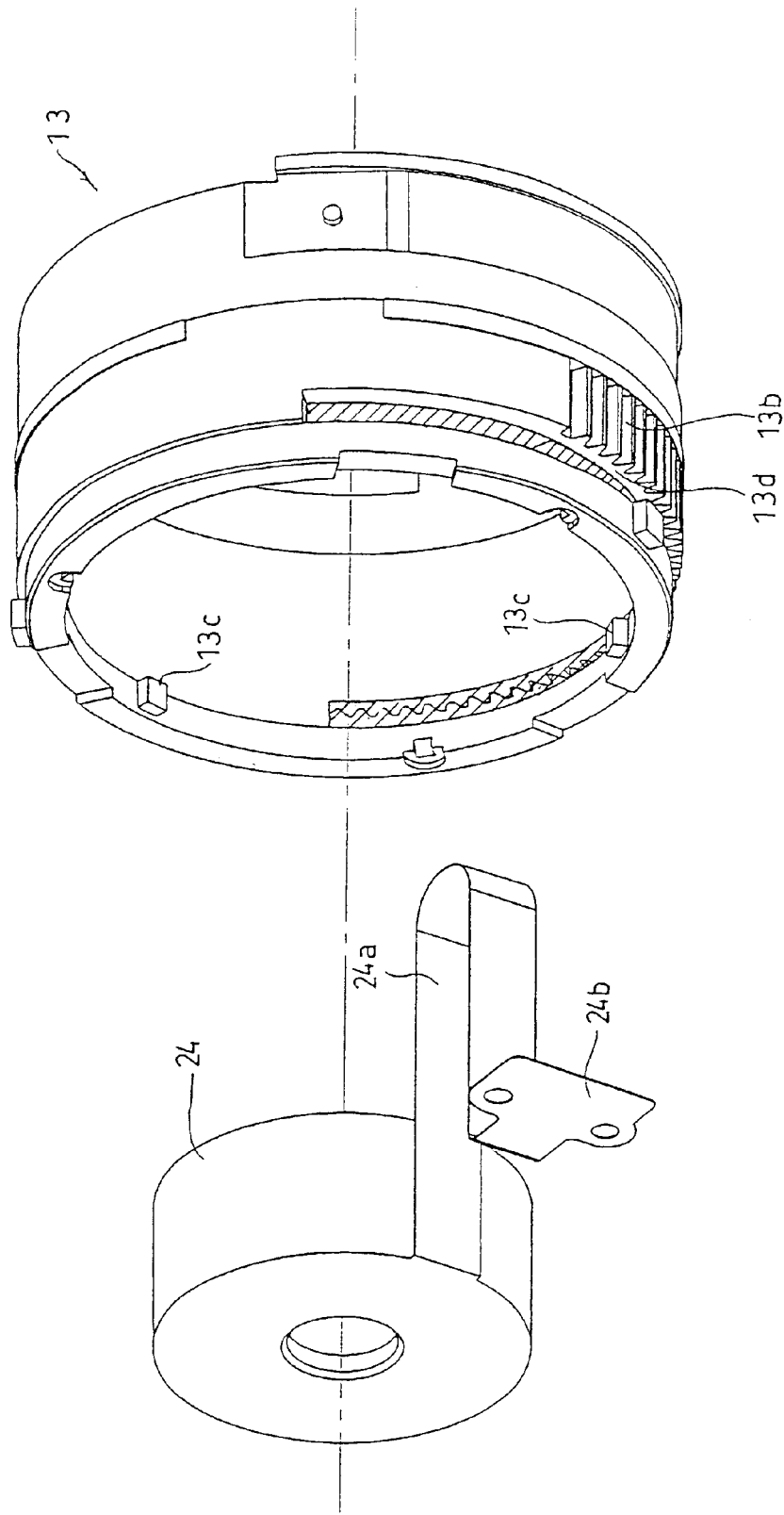
FIG. 23 is a perspective view of a shutter block, a flexible circuit board extending from the shutter block, and a rotational barrel.

The rotational barrel 13 is provided with a circumferentially extending FPC insertion slot 13d between the inward projections 13c and the circumferential gear 13b (behind the inward projections 13c but in front of the circumferential gear 13b) with respect to the optical axis. The length (angle) of the FPC insertion slot 13d in the circumferential direction corresponds to the total angular displacement range of the rotational barrel 13 and the width of the FPC 24a. Namely, the length (angle) of the FPC insertion slot 13d is determined so that no interference between the FPC insertion slot 13d and the FPC 24a in the overall range of the angular displacement of the rotational barrel 13 (e.g., approximately 160 degrees) occurs. The structure for extending the FPC 24a from the shutter block is constituted only by the FPC insertion slot 13d. In FIG. 23, the FPC insertion slot 13d is hatched for clarity.

In the assembly of the zoom lens barrel, the FPC 24a extends rearward from the shutter block 24, is bent forward at the rear end of the assembly of the linear guide barrel 16 and the first cam barrel 17 to form a loop (bent portion) 24c, extends forward in a gap between the first cam barrel 17 and the rotational barrel 13, and extends outward from the rotational barrel 13 through the FPC insertion slot 13d. The connector portion 24b of the front end of the FPC 24a extending out of the rotational barrel 13 is soldered to the substrate outside the rotational barrel 13.

Figure 20:
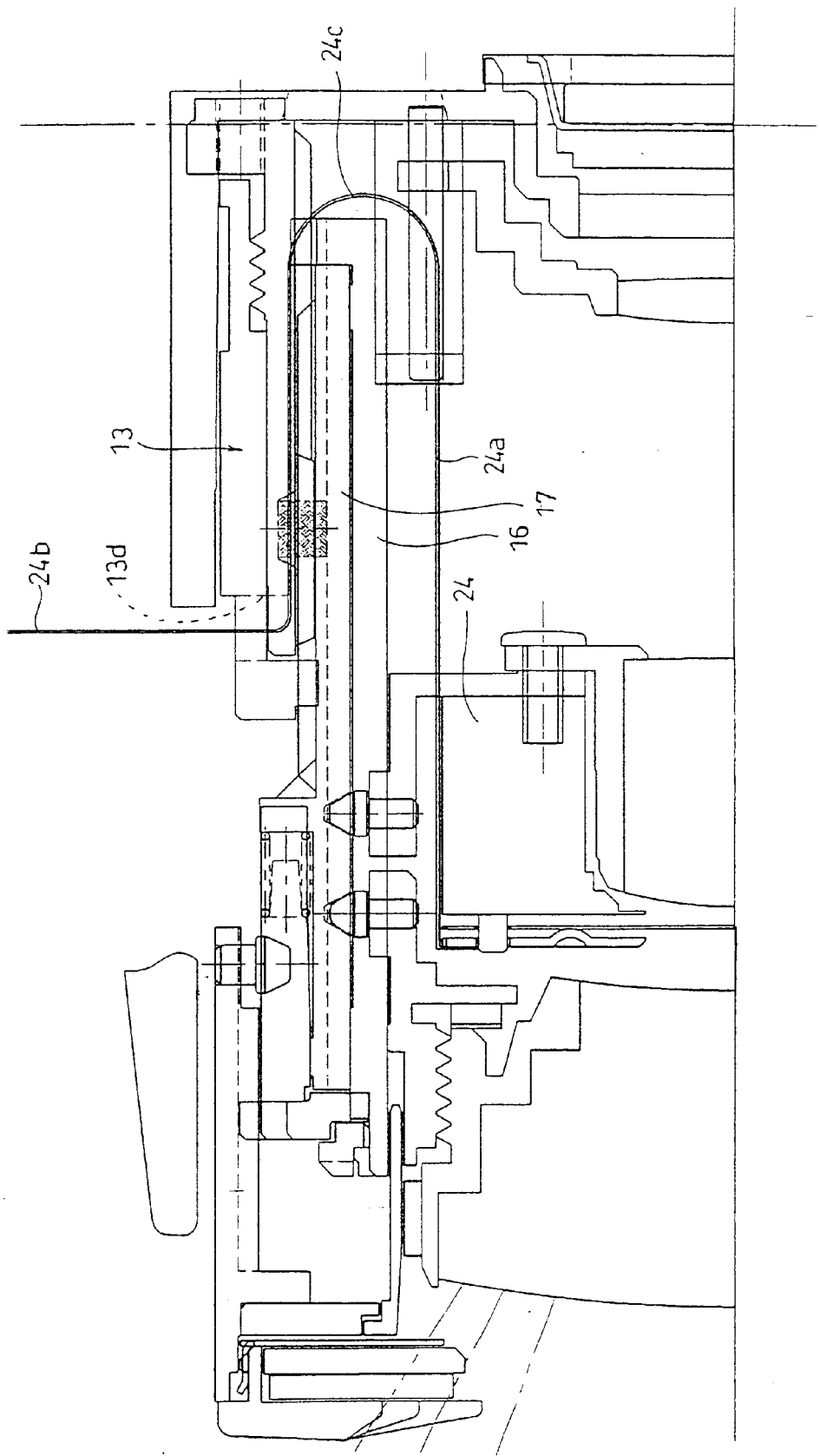
FIG. 20 is an axial cross sectional view of a zoom lens at the telephoto extremity, and a flexible circuit board extending from a shutter block.
Figure 21:
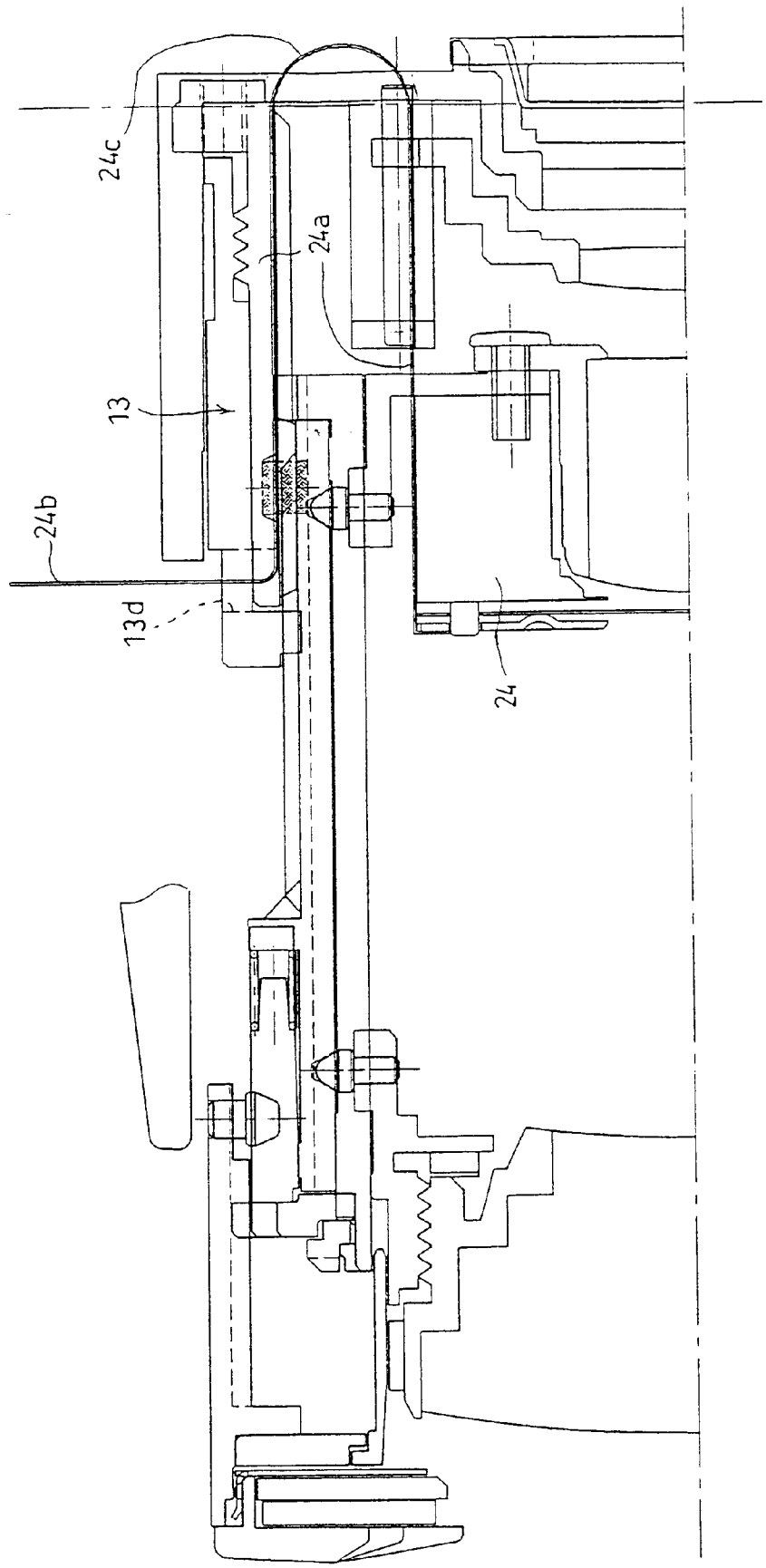
FIG. 21 is an axial cross sectional view of a zoom lens at the wide-angle extremity, and a flexible circuit board extending from a shutter block.
Figure 22:
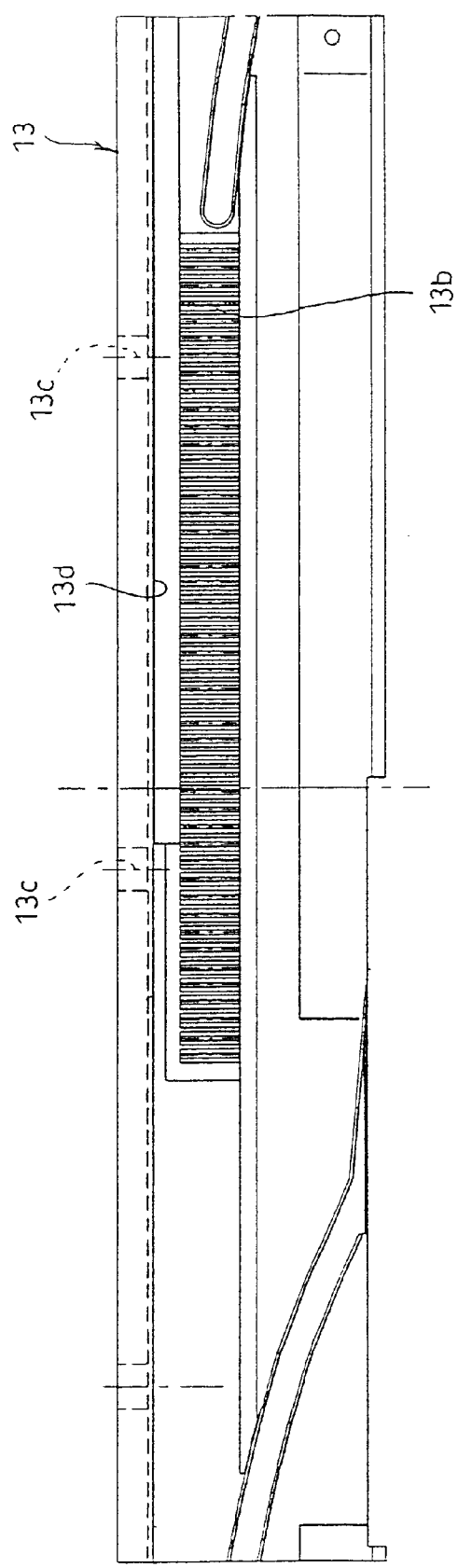
FIG. 22 is a developed view of a rotational barrel having a flexible circuit board insertion slot.

In the guide device constructed as above, when the rotation is transmitted to the first cam barrel 17 through the rotational barrel 13, so that the first and second lens frames 22 and 23 (first and second lens groups L1 and L2) are moved along predetermined zoom paths via the three first and second cam grooves 17C1 and 17C2, the shutter block 24 secured to the second lens frame 23 is also moved reciprocally in the axial direction in accordance with the movement of the second lens frame 23. During the axial movement of the shutter block 24, the loop portion 24c of the rear end of the FPC 24a is moved forward or rearward. At the rear movement extremity of the shutter block 24, the FPC 24a extends toward the camera body through the opening of the housing 10 (FIGS. 20, 21). The rotational barrel 13 which rotates, also moves in the optical axis direction in accordance with the engagement of the female screw 13a and the male screw 11a. The length of the FPC insertion slot 13d in the optical axis direction is such that no interference of the FPC 24a with the FPC insertion slot 13d takes place during the axial movement of the rotational barrel 13. Moreover, as mentioned above, the length of the FPC insertion slot 13d in the circumferential direction is such that no interference thereof with the FPC 24a occurs in the overall angular displacement range of the rotational barrel 13. Consequently, it is possible to guide the FPC 24a extending outward from the shutter block 24 without interfering with the movable members over the entire zoom range.

The guide structure constructed as above can be advantageously used particularly with a zoom lens barrel in which the rotation of the rotational barrel 13 is transmitted to the first cam barrel 17. Namely, it is possible to extend the FPC 24 outward in the radial direction of the zoom lens barrel through the FPC insertion slot 13d of a necessary circumferential width formed in the rotational barrel 13, without using a rotation transmission structure between the rotational barrel 13 and the first cam barrel 17. In the illustrated embodiment, the rotation is transmitted to the first cam barrel 17 from the rotational barrel 13 through the inward projections 13c and the rotation transmission grooves 17c, which are spaced at 120 degree intervals. If no FPC insertion slot 13d was formed in the rotational barrel 13, so that the FPC 24a extends between the adjacent inward projections 13c and bends outward at the front end surface of the rotational barrel 13, the angle of the FPC passing groove would have to be less than 100 degrees, taking the width of the FPC 24a into account. Such a structure would make it impossible to obtain a large enough angular displacement of the first cam barrel 17 for carrying out a zooming operation. However, in the arrangement in which the FPC insertion slot 13d is provided in the rotational barrel 13, it is possible to reduce the restriction to the angular displacement of the first cam barrel 17 (rotational barrel 13) in order to extend the FPC 24a outward. In the present embodiment, the FPC insertion slot 13d can extend circumferentially more than 120 degrees if the inward projections 13c and the rotation transmission grooves 17c are respectively spaced at 120 degree intervals.

Although the linear guide barrel 16 and the first cam barrel 17 are moved together in the optical axis direction in the illustrated embodiment, it is alternatively possible to rotate the first cam barrel 17 at a constant position in the optical axis direction. In this alternative, it is possible to guide the first lens frame 22 and the second lens frame 23 so as to move in the optical axis direction by guide means other than the linear guide barrel 16.

As can be understood from the foregoing, according to the present invention, in a zoom lens barrel having a shutter block which is moved in the optical axis direction together with any one of a plurality of lens groups, the flexible circuit board extending outward from the shutter block can be guided without interfering with the zoom mechanism and without reducing the mechanical strength of the components.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A selectable assembling device of a zoom lens barrel, comprising:

a stationary barrel having a female helicoid and linear guide grooves, said linear guide grooves being formed across said female helicoid extending parallel to the optical axis of said zoom lens barrel, said linear guide grooves spaced at 120 degree intervals about the axis of said stationary barrel, wherein a portion of each of said linear guide grooves includes an introducing groove formed by cutting a portion of said female helicoid;

a cam ring which is provided on the outer peripheral surface thereof with a male helicoid which is engaged with the female helicoid of the stationary barrel, said cam ring including bottomed cam grooves provided at 120 degree intervals about the axis of said cam ring on the inner peripheral surface thereof, said cam ring being rotated with respect to said stationary barrel which does not rotate;

a linear guide barrel which is provided with linear guide projections and linear guide slots spaced at 120 degree intervals about the axis of said linear guide barrel, said linear guide projections being engaged in the linear guide grooves of the stationary barrel, said linear guide barrel and said cam ring being coupled so that the linear guide barrel is rotatable relative to the optical axis and moveable in the optical axis direction together with the cam ring; and a plurality of lens frames which are provided with sliding projections, that are spaced at 120 degree intervals about the optical axis, which are engaged in said linear guide slots of the linear guide barrel, each of said sliding projections comprising a cam follower thereon which is fitted in a corresponding bottomed cam groove of the cam ring;

wherein, upon assembly, a first relative angular position of assembly for the cam ring and the linear guide barrel can be selected from among three circumferential positions spaced at 120 degree intervals about common axes of said cam ring and said linear guide barrel.

2. The assembling device according to claim 1, wherein the assembly of the cam ring and the linear guide barrel is constructed so that when the male helicoid of the cam ring is engaged with the female helicoid of the stationary barrel, the linear guide projections of the linear guide barrel are engaged in the linear guide grooves of the stationary barrel at a second relative angular position selected from three circumferential positions spaced at 120 degree intervals about common axes of said linear guide barrel and said stationary barrel while maintaining said first relative angular position.

3. The assembling device according to claim 1, wherein said cam ring is provided with identification indicia which are adapted to identify the three circumferential positions of said first relative angular position.

4. The assembling device according to claim 1, wherein said first relative angular position is a combination of a third relative angular position and a fourth relative angular position;

wherein said sliding projections of the plurality of lens frames are engaged in the linear guide slots of the linear guide barrel at said third relative angular position selected from three circumferential positions spaced at 120 intervals about the optical axis; and wherein said cam followers of said sliding projections are engaged in the bottomed cam grooves of the cam ring at said fourth relative angular position selected from three circumferential positions spaced at 120 degree intervals about the axis of said cam ring.

5. A guide device for guiding a flexible circuit board of a zoom lens barrel comprising:

a plurality of lens groups which are guided to move in an optical axis direction of said zoom lens barrel to vary a focal length of a photographing optical system;

a shutter block secured to any one of the lens groups;

a rotational barrel;

a cam ring which is located inside the rotational barrel and which is rotated by the rotation of the rotational barrel to move the lens groups in the optical axis direction;

a flexible circuit board which is connected at one end thereof to the shutter block; and a flexible circuit board insertion slot formed in the rotational barrel and extending in the circumferential direction of said rotational barrel; wherein said flexible circuit board extends rearward from the shutter block, bends forward at the rear end of the cam ring, extends forward between the rotational barrel and the cam ring, and extends to the outside of the rotational barrel through the flexible circuit board insertion slot of the rotational barrel.

6. The guide device according to claim 5, wherein said rotational barrel is provided on the inner peripheral surface thereof with a plurality of inward projections that are spaced in the circumferential direction;

wherein said cam ring is provided on the outer peripheral surface thereof with a plurality of axially extending rotation transmission grooves that are spaced in the circumferential direction, wherein each rotation transmission groove can be engaged with each respective said inward projections; and wherein said flexible circuit board insertion slot of the rotational barrel is located behind the inward projections with respect to said optical axis.

7. The guide device according to claim 6, wherein said inward projections of the rotational barrel are spaced from one another at 120 degree intervals, wherein said rotation transmission grooves of the cam ring are spaced from one another at 120 degree intervals, and wherein said flexible circuit board insertion slot of the rotational barrel extends for at least 120 degrees about said optical axis.

8. The guide device according to claim 5, wherein said cam ring is connected to a stationary barrel via helicoids so as to rotate and move in the optical axis direction.

9. The guide device according to claim 8, wherein said rotational barrel is connected to the stationary barrel by a thread whose lead is smaller than that of the helicoids so as to rotate and move in the optical axis direction.

* * * * *